(12) United States Patent
Singh et al.

(10) Patent No.: US 11,042,934 B2
(45) Date of Patent: Jun. 22, 2021

(54) CRYPTO-MACHINE LEARNING ENABLED BLOCKCHAIN BASED PROFILE PRICER

(71) Applicant: Bank of America Corporation, Charlotte, NC (US)

(72) Inventors: Awadhesh Pratap Singh, Telangana (IN); Vinay Laxmikant Bade, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 325 days.

(21) Appl. No.: 15/811,108

(22) Filed: Nov. 13, 2017

(65) Prior Publication Data

US 2019/0147532 A1    May 16, 2019

(51) Int. Cl.
| | | |
|---|---|---|
| *G06Q 40/04* | (2012.01) | |
| *G06N 20/00* | (2019.01) | |
| *G06Q 20/08* | (2012.01) | |
| *H04L 9/06* | (2006.01) | |

(52) U.S. Cl.
CPC .............. *G06Q 40/04* (2013.01); *G06N 20/00* (2019.01); *G06Q 20/085* (2013.01); *H04L 9/0643* (2013.01); *H04L 2209/56* (2013.01)

(58) Field of Classification Search
CPC ............... G06Q 20/065; G06Q 20/381; G06Q 2220/00; G06Q 40/04; H04L 2209/56; H04L 2209/38
USPC ...................... 705/35, 36 R, 39, 50; 713/171
See application file for complete search history.

(56) References Cited

U.S. PATENT DOCUMENTS

| | | | |
|---|---|---|---|
| 9,298,806 B1 | 3/2016 | Vessenes et al. | |
| 9,397,985 B1 | 7/2016 | Seger, II et al. | |
| 10,055,715 B1* | 8/2018 | Grassadonia | G06Q 20/36 |
| 10,163,079 B1* | 12/2018 | Brock | G06Q 20/20 |
| 2016/0261404 A1 | 9/2016 | Ford et al. | |
| 2016/0292680 A1 | 10/2016 | Wilson, Jr. et al. | |
| 2017/0048209 A1* | 2/2017 | Lohe | H04L 63/0442 |
| 2017/0083907 A1* | 3/2017 | McDonough | G06Q 20/14 |
| 2017/0140375 A1 | 5/2017 | Kunstel | |
| 2017/0178237 A1 | 6/2017 | Wong | |

(Continued)

FOREIGN PATENT DOCUMENTS

WO    WO-2016072739 A1 *  5/2016    ............. G06Q 40/02

OTHER PUBLICATIONS

U. Mukhopadhyay, et al., "A brief survey of Cryptocurrency systems," 2016 14th Annual Conference on Privacy, Security and Trust (PST), Auckland, 2016, pp. 745-752, doi: 10.1109/PST.2016.7906988. (Year: 2016).*

*Primary Examiner* — Kelly S. Campen

(74) *Attorney, Agent, or Firm* — Banner & Witcoff, Ltd.; Michael A. Springs

(57) ABSTRACT

A crypto-machine learning enabled blockchain based profile pricer processes computer-readable instructions to determine requested information for a user that can be displayed on a user interface in real-time or near real-time of the user's request. In addition, the crypto-machine learning enabled blockchain based profile pricer processes provided data to be customized for the user based on a user profile stored in the memory as well as based on third party data stored in a database of related information. The pricer communicates the data to the user using blockchains via a smart contract using a private key and initiates a data transfer based on an input received from the user.

18 Claims, 14 Drawing Sheets

(56) References Cited

U.S. PATENT DOCUMENTS

2019/0057226 A1* 2/2019 Arbutina .............. G06F 16/955
2019/0095992 A1* 3/2019 Soh ...................... G06Q 20/10

* cited by examiner

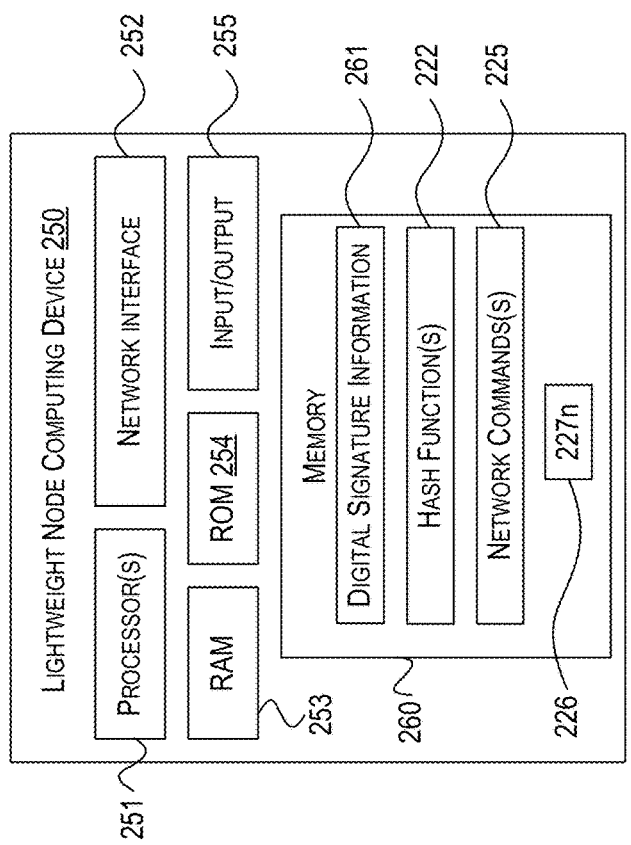
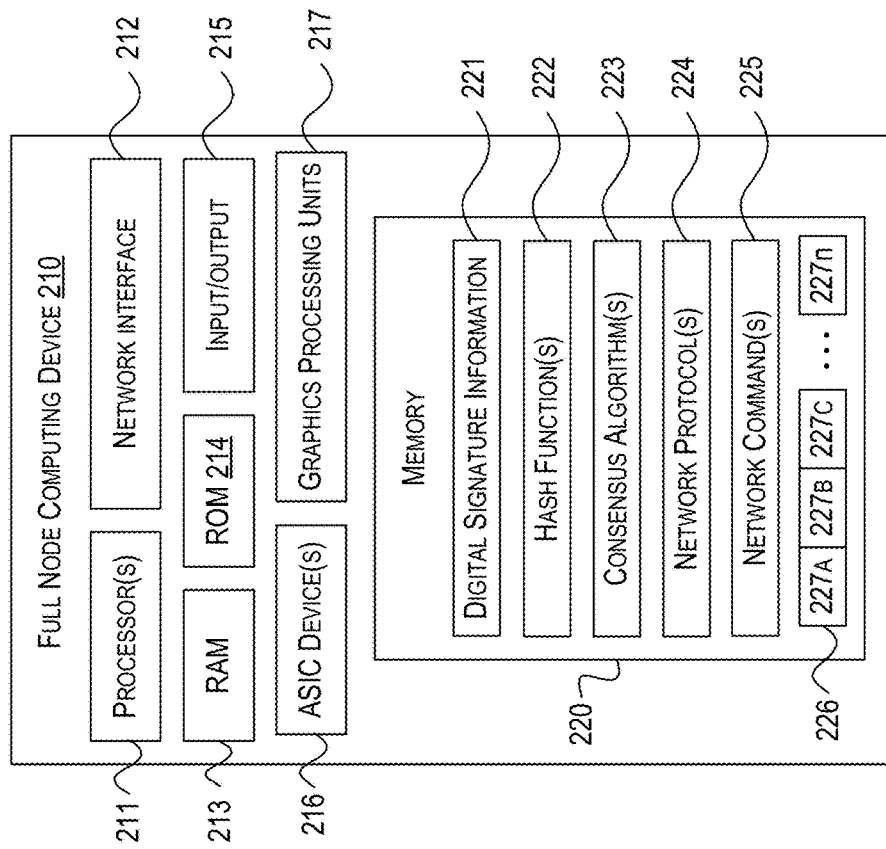
FIG. 3B
FIG. 3A

CRYPTO-MACHINE LEARNING ENABLED BLOCKCHAIN BASED PROFILE PRICER

TECHNICAL FIELD

Aspects of the disclosure relate to cryptography, and more specifically, to a cryptography based communications system that provides technological advancements over existing systems by providing secure communications with enhanced speed and transparency.

BACKGROUND

Companies involved in international transactions, including financial businesses, manufacturing companies, and service-related businesses, often engage in the exchange of foreign currency. Foreign currency exchanges may include a financial institution operating as a buyer, seller, or an intermediary, e.g., between a buyer and a seller, for the exchange of a particular currency. The exchange of foreign currency, or "forex" trading, is often performed by financial institutions, such as banks. These exchanges may include a difference between a real price and a quoted price, or a spread. Difficulties often arise in providing this spread and other relevant information to interested parties in a manner that is secure, timely, and transparent. Methods such as phone calls and e-mails to deliver trade and pricing information have disadvantages in that they lack sufficient security, timeliness, and transparency. Additional difficulties arise in determining a spread that is likely to result in an accepted offer, in an environment with many offers from competing entities, leading to system-wide inefficiencies and missed opportunities for parties on both sides of a potential transaction such as a forex trade.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards crypto-machine learning enabled blockchain based profile pricer. A first aspect includes receiving third party data of a plurality of exchanges of foreign currency, such as by one or more servers. Another aspect includes determining a user profile, based on the third party data, to provide a customized quote to the user for an exchange of foreign currency that is competitive with quotes or trades for transactions of the same currency types. This determining can be performed by one or more processors in a cryptography machine learning enabled blockchain based apparatus. In another aspect, the quote can be transmitted to a blockchain node for transparent, secure, and timely access by a user using a private key. The disclosed crypto-machine learning enabled blockchain based profile pricer overcomes limitations of the prior art by providing transparent, secure, and real-time or near real-time quotes for an exchange of foreign currency that is customized to a user and accounts for transactions with third parties involving the same types of currency. Aspects described herein provide transparency to a customer about a trade and pricing information, such as a spread for a forex trade, which can lead to increased trust and retention of customers. Aspects described herein also provide mechanisms for providing increased competitiveness of quotes for greater customer value. Further, aspects include enhanced security for communicating sensitive financial information in a reliable and efficient manner. These and additional aspects will be appreciated with the benefit of the disclosures discussed in further detail below.

Various aspects described herein may be embodied as a system, method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3A depicts an illustrative example of a full node computing device that may be used in accordance with one or more illustrative aspects described herein.

FIG. 3B depicts an illustrative example of a lightweight node computing device that may be used in accordance with one or more illustrative aspects described herein.

DETAILED DESCRIPTION

Figure 1:
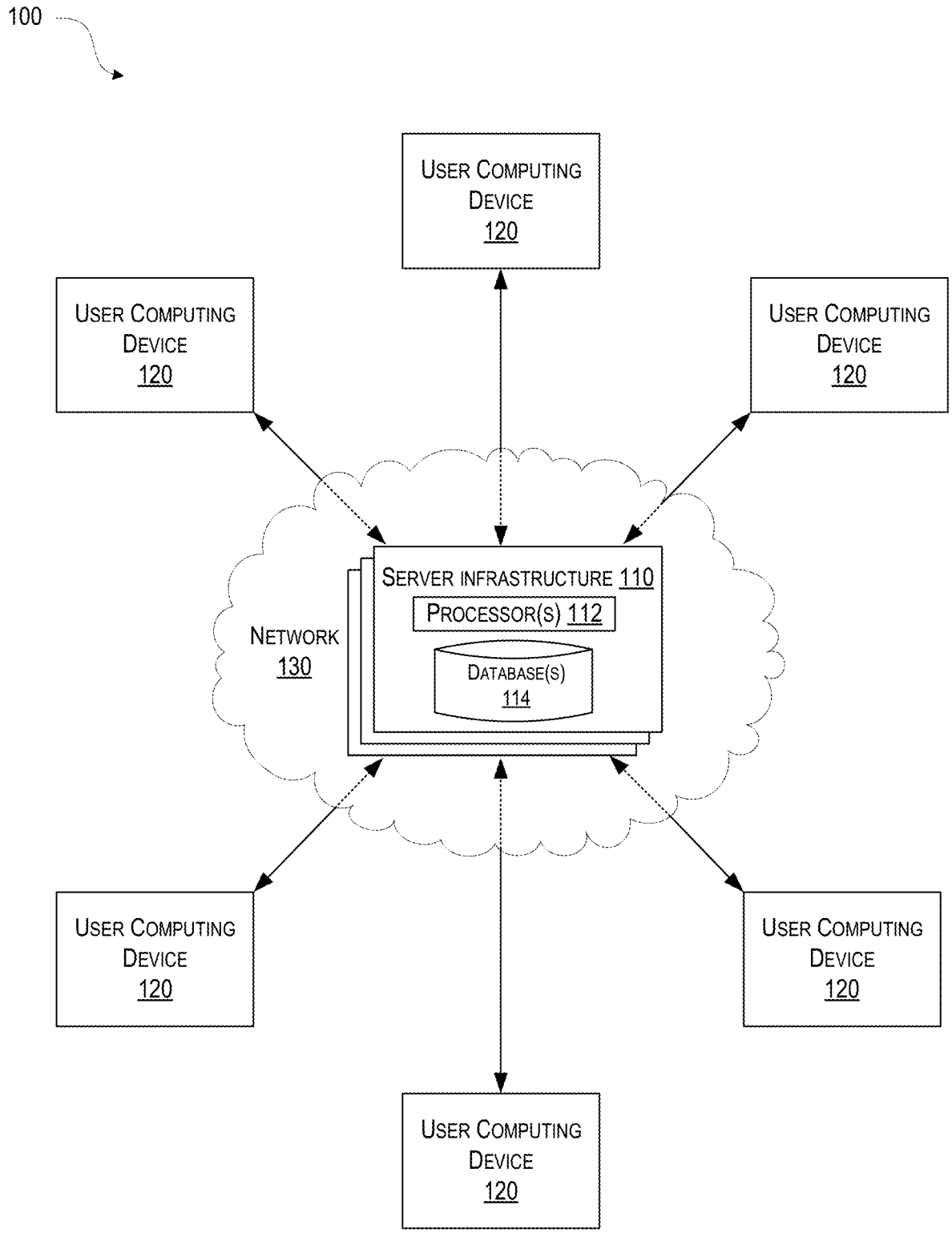
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards foreign currency exchange, and more particularly, to analyzing quotes and/or trades for third-party foreign currency exchanges, as well as analyzing data specific to one or more users, to determine a customized quote that has an increased likelihood of acceptance. Aspects described herein also are directed to communicating quotes, spreads, agreements, and other information related to a financial transactions in a secure, transparent, and prompt manner using blockchain technology.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to each of the computing devices comprising server infrastructure 110. The local network connecting auto identification and mapping computing platform 120, system infrastructure 130, and/or post-performance review computing device 140 may interface with network 150 and enable communication with user computing devices 110A-110N.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
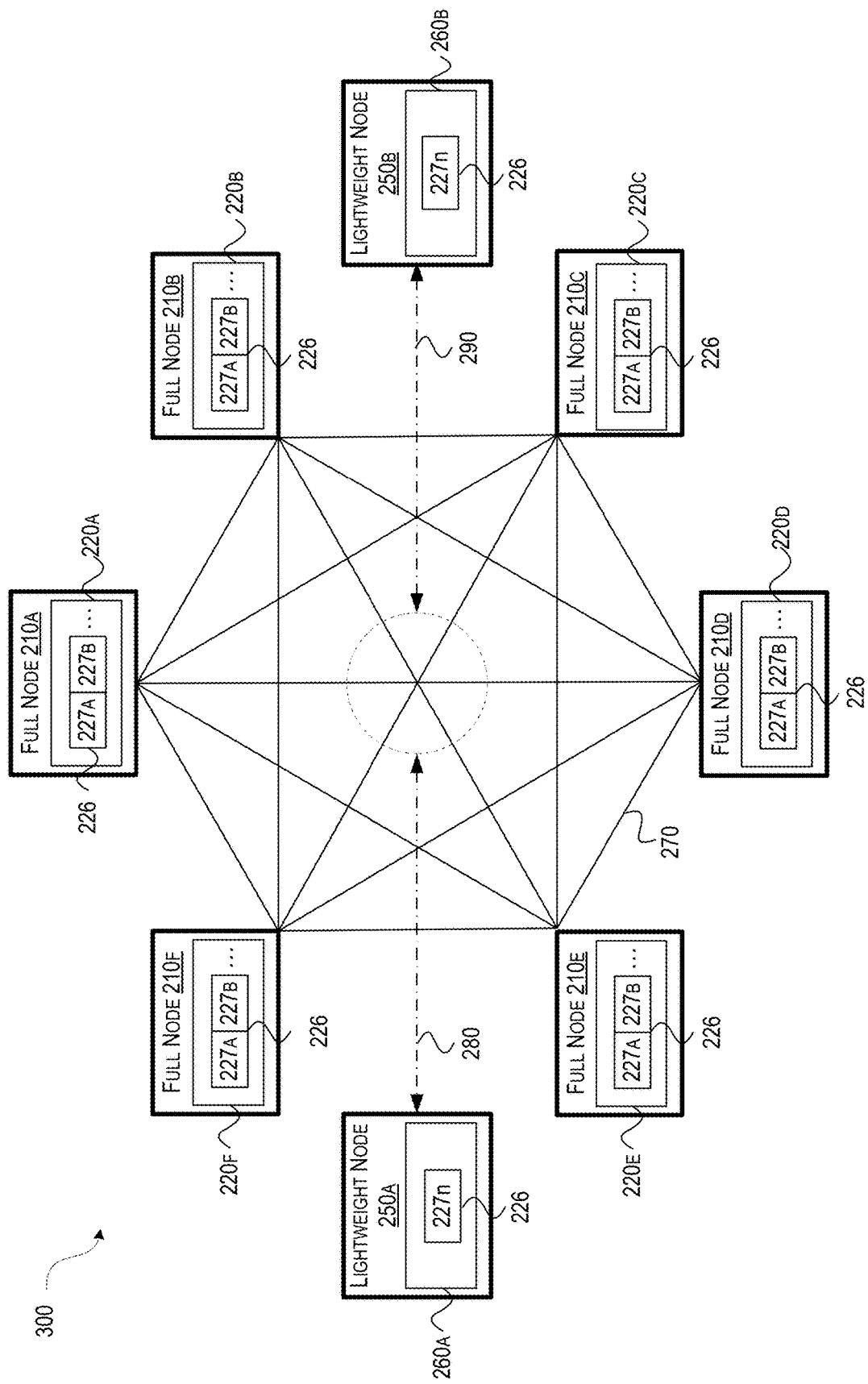
FIG. 2 depicts an illustrative example of decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and create decentralized P2P network 270. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to blockchain 226 in decentralized P2P network 270, which may entail a data transfer from a private/public key associated with lightweight node computing device 250A to a private/public key associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with lightweight node computing device 250B. Processors of lightweight node computing device 250A may execute digital signature algorithms to digitally sign balance sheet transaction network function request 280 with the private key associated with lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the public key of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective public keys. Full node computing devices 210A-210F, however, may not vote for themselves to be delegates. Once the group of delegates are chosen, the group of delegates from full node computing devices 210A-210F select a public key associated with one of full node computing devices 210A-210F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing balance sheet transaction network function request 280. After the new block has been added to blockchain 226, balance sheet transaction network function request 280 may be considered to be executed and the data transfer from the private/public key associated with lightweight node computing device 250A to the private/public key associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to blockchain 226 in decentralized P2P network 270, which may facilitate a dual data transfer between a private/public key associated with lightweight node computing device 250B and a private/public key associated lightweight node computing device 250A. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 260A for executing smart contract operation network function request 290. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract operation network function request. The smart contract operation network function request may further include the public key associated with the smart contract. Processors of lightweight node computing device 250A may execute digital signature algorithms to digitally sign the smart contract operation network function request with the private key associated with lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing the smart contract operation network function request. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, and the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithm 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, and the like.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, and the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Figure 4:
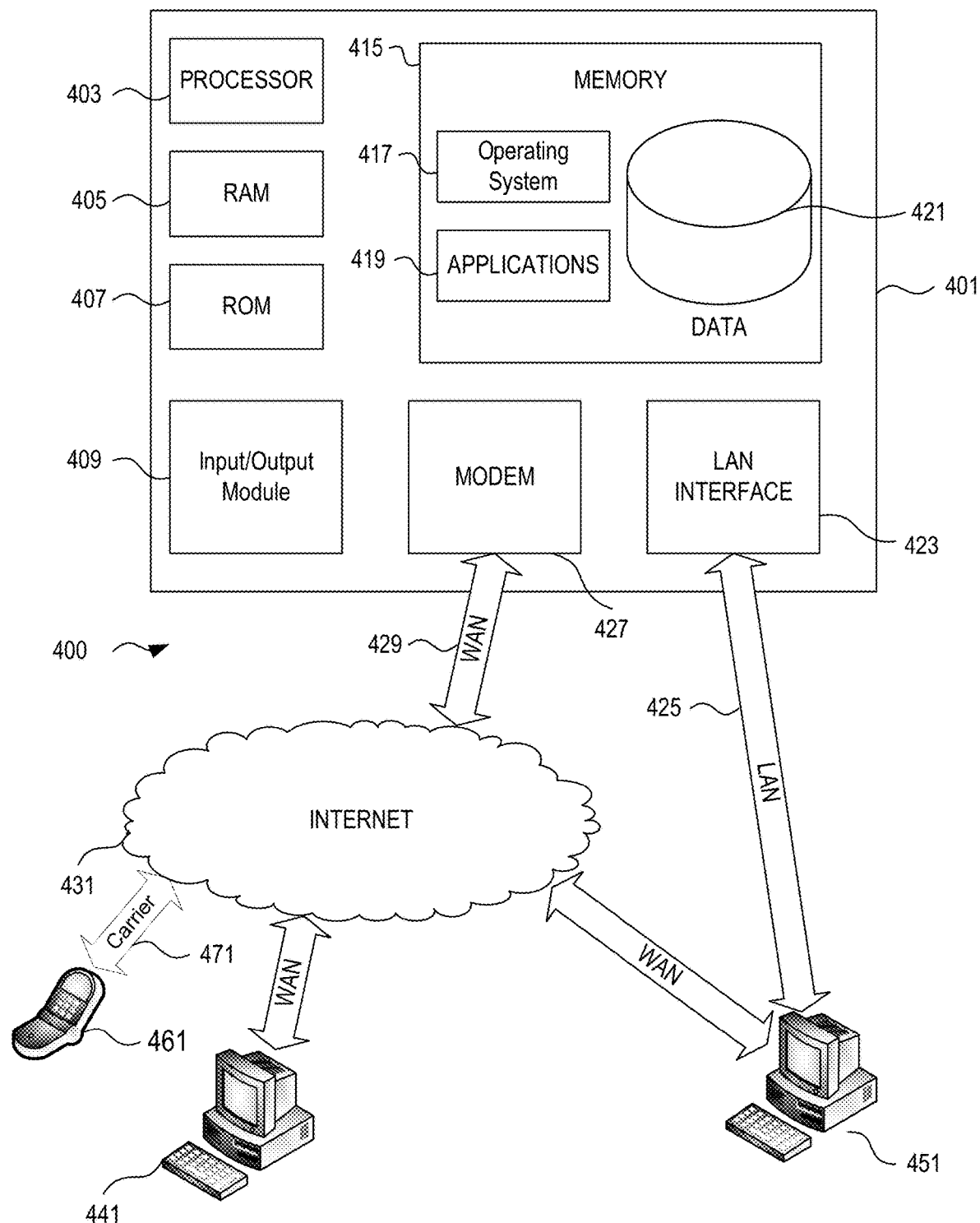
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown).

Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium.

Figure 5:
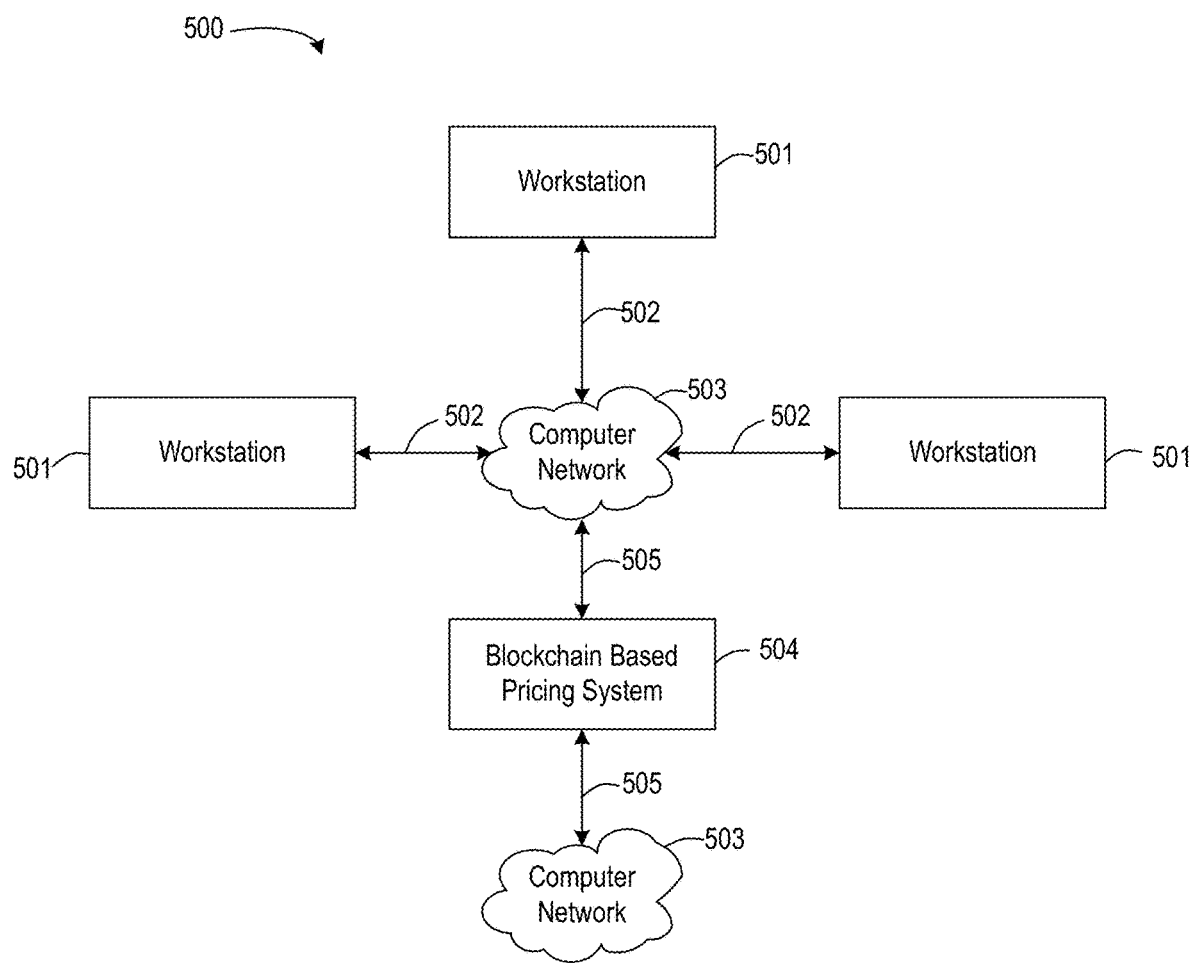
FIG. 5 depicts an illustrative example of a system in accordance with one or more illustrative aspects described herein.

Referring to FIG. 5, an illustrative system 500 for implementing example embodiments according to the present disclosure is shown. As illustrated, system 500 may include one or more workstation computers 501. Workstations 501 may be local or remote, and may be connected by one of communication links 502 to computer network 503 that is linked via communication links 505 to blockchain based pricing system 504. In system 500, blockchain based pricing system 504 may comprise any suitable server, processor, computer, or data processing device, or combination of the same. Blockchain based pricing system 504 may be used to process the instructions received from, and the transactions entered into by, one or more participants.

Computer network 503 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communication links 502 and 505 may be any communication links suitable for communicating between workstations 501 and blockchain based pricing system 504, such as network links, dial-up links, wireless links, and hard-wired links.

The steps that follow in the Figures may be implemented by one or more of the components in FIGS. 4 and 5 and/or other components, including other computing devices.

Blockchain Based Pricing Systems

Figure 6:
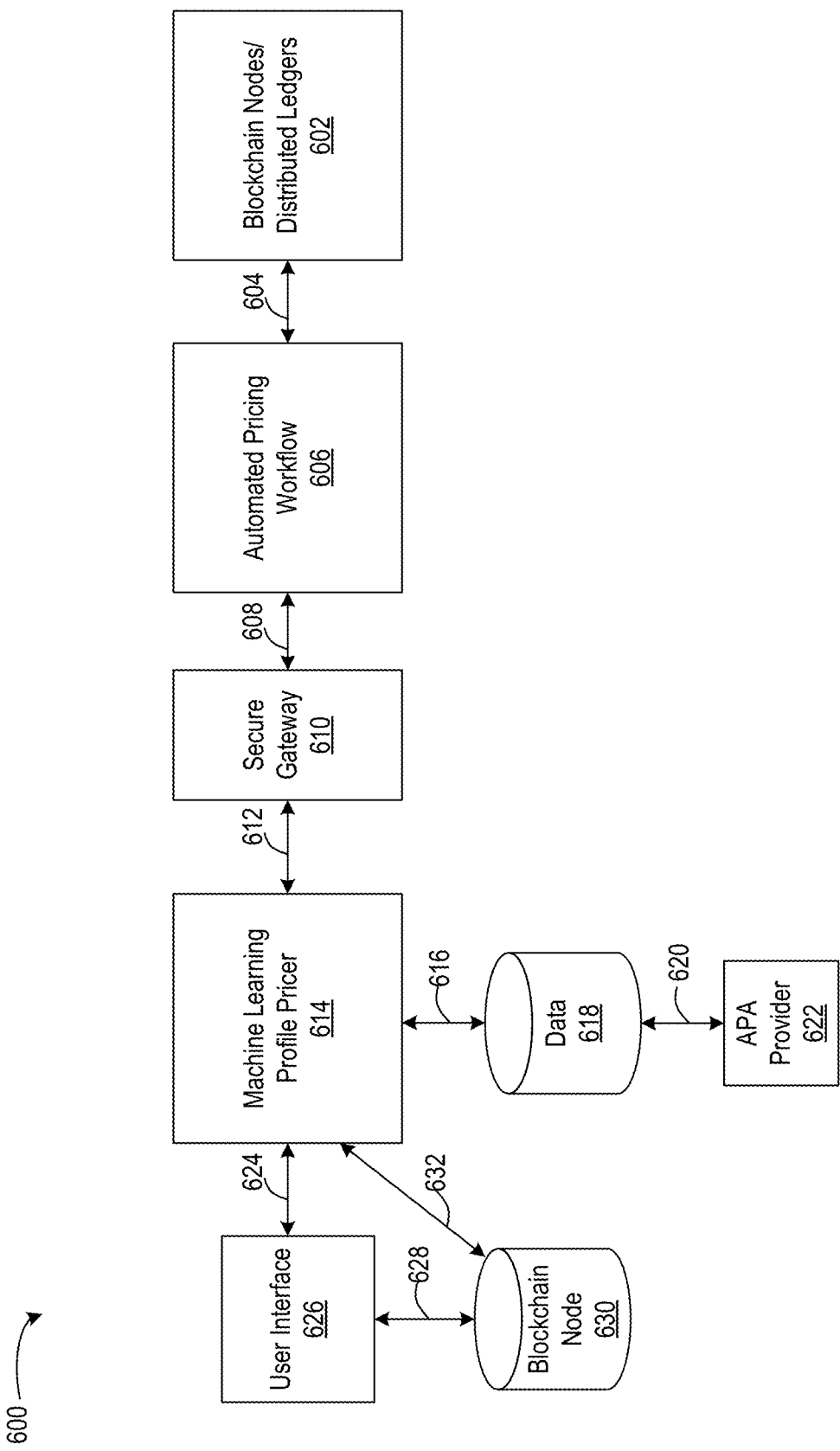
FIG. 6 depicts an illustrative example of C in accordance with one or more illustrative aspects described herein.

FIG. 6 shows a crypto-machine learning enabled blockchain based profile pricing system 600 in accordance with an aspect of the disclosure. Some or all of the components of crypto-machine learning enabled blockchain based profile pricing system 600 may be included in the blockchain based pricing system 504 described above regarding FIG. 5. System 600 can include a machine learning profile pricer 614 with one or more interfaces for communications with a user interface 626, blockchain node 630, data storage 618, and blockchain distributed ledgers of financial instruments in a plurality of blockchain nodes (referred to herein as "blockchain nodes/distributed ledgers 602"). Optionally, user interface 626 and/or blockchain node 630 may be included within a crypto-machine learning enabled blockchain apparatus or may be remote from such an apparatus, such as at a user location. The data storage 618 can comprise a high-performance in memory database, and at least some of the processes for determining a spread or other information for a quote, described further herein, can be determined in advance of receiving a request for a quote and resulting data can be stored in data storage 618. As examples, data storage 618 can store a plurality of user profiles, e.g., in one or more databases, that can be used for determining information, such as spreads, quotes, and the like, in real-time or near real-time with receiving a request for a quote, as described herein. One or more user profiles can be further analyzed in response to receiving a request for a quote, and updated based on that analysis, e.g., for use in determining a spread, quote, or other information in the future. In addition, the data storage 618 can include third party data, such as from an Approved Publication Arrangement (APA) provider 622. For example, as part of a Markets in Financial Instruments Directive ("MiFID") scheduled to enter into effect on Jan. 3, 2018, MiFID 2, APA providers will provide access to information such as quotes and trades from financial services institutions for a period of the previous six months. Information such as pricing and a spread of a foreign currency exchange, e.g., the difference between a market price and a quoted price, will be accessible. As examples, the data storage 618 can host data from the prior six months of trades that were accepted by a client from a third party, as well as data about quotes that were rejected by a client, including quotes from the financial institution determining to provide a new quote to the client. The data storage 618 can also host the data described above for a plurality of clients and potential clients. A separate profile for each client, potential client, and/or third party can be maintained and stored at data storage 618 as one or more user profiles.

The machine learning profile pricer 614 may communicate with the blockchain nodes/distributed ledgers 602 via a secure gateway 610. The machine learning profile pricer 614 may also communicate with, or optionally include, an automated pricing workflow 606. In some examples, user interface 626 may be included in any of computing devices 441, 451, and 461. The user interface 626 can provide a mechanism for a user of a computing device, such as a computing device 441, 451, or 461, to communicate with the machine learning profile pricer 614, via communication link 624. In an example, a user may be a client or potential client of financial services, such as from a bank or other financial services provider. Using a user interface 626, such as a touch screen, keypad, or other input of a computing device 441, 451, or 461, the user may request from the financial services provider, via communication link 624, information, such as information relating to currency exchange, savings or lending interest rates, or other transactions. The request may be received by, and/or further transmitted to, a machine learning profile pricer 614 used by the financial services provider to generate information, such as a quote or spread for a particular financial transaction, in response to such a user request. In addition, a user can also transmit user related information to the machine learning profile pricer 614, such as a username and/or password, a private key, or other information that can be used to identify and/or authenticate a user. The user can also receive information from the financial services provider, such as in response to a user's request for information, via communication link 624. In addition, some or all information for communication between a user and the financial services provider can be communicated between machine learning profile pricer 614 and blockchain node 630, via communication link 632. Using user interface 626, a user can transmit to, or receive such information from, blockchain node 630 via communication link 628. By using a blockchain node 630 for exchanging communications between a user interface 626 and a machine learning profile pricer 614, information can be communicated in a secure and transparent manner by using blockchain technology as described above regarding FIGS. 1, 2, and 3.

According to one or more aspects, machine learning profile pricer 614 may be used by a financial services provider to provide a customized quote, or spread, for a financial service, including, e.g., a forex trade. The machine learning profile pricer 614 can receive user-related data, such as from user interface 626 and/or blockchain node 630. The machine learning profile pricer 614 may also receive user-related data from an automated pricing workflow 606, which can be transmitted, via communication links 608 and 612, in a secure manner using a secure gateway 610. In addition, the machine learning profile pricer 614 can receive third party data, such as from APA provider 622. The machine learning profile pricer 614 can store user-related data and/or third party data in data storage 618, and using data from the data storage 618, the machine learning profile pricer 614 can determine a customized quote for financial service for the user in the manner further described herein. In some embodiments, a cryptography machine learning enabled blockchain based apparatus may comprise one or more of the machine learning profile pricer 614, secure gateway 610, automated pricing workflow 606, and data storage 618.

In some examples, the automated pricing workflow 606 can be a mechanism, engine, or combination of engines, used by a financial services provider to determine financial related agreements between the provider and its clients. Information from prior transactions, including, e.g., agreements, quotes, spreads, requests, approvals, or rejections, can be communicated from the automated pricing workflow 606 to the machine learning profile pricer 614 for use in determining a customized quote for a user. In addition, the automated pricing workflow 606 can receive information from the machine learning profile pricer 614, such as new requests for quotes, new quotes or spreads, new approvals or rejections, or new third party data, for storage, further analysis, or incorporation into new agreements. The automated pricing workflow 606 can provide received information or information it has determined, such as agreements, agreed terms, approvals, or rejections, for blockchain nodes/distributed ledgers 602 via communication link 604.

In some aspects, other forms of communications via one or more of communication links, such as communication links 624, 628, 632, and 604, can include multi-lateral private message communications. As an example, if a "51%" blockchain problem is anticipated such that a single blockchain user could obtain control of a majority or a near majority of the blockchains in a network in a manner that could render the network vulnerable, one or more of the above communication links can use multi-lateral private messages to communicate sensitive data. As examples, trade and pricing information, such as quotes, spreads, and trade agreements, can be communicated via multi-lateral private messages to prevent a "51%" blockchain attack. Upon a determination that the threat of an attack has been eliminated, the communications can return to using blockchains. Examples of communications and monitoring for preventing such an attack are described below regarding FIG. 8.

By using blockchain nodes/distributed ledgers 602 for communicating information to and from automated pricing workflow 606, information can be communicated in a secure and transparent manner based on blockchain technology described above regarding FIGS. 1, 2, and 3. As examples, blockchain distributed ledgers can be stored in multiple blockchain nodes that can be capable of hosting trade and pricing (including, e.g., spread) information, such as described above and further below regarding FIG. 10. Blockchain nodes/distributed ledgers 602 have advantages over other forms of communicating data such as trade and pricing information, including, e.g., advantages of immutability, security, traceability, and recovery, described further below.

Immutability refers to something that is unchanging over time, or unable to be changed. In aspects of the disclosure, once data is written to a blockchain, that data cannot be changed—not even by a system administrator or other person having a high level of access. Communicating data via blockchains, as described herein, provides immutability that is particularly advantageous from audit and compliance perspectives relevant to financial transactions. A provider of data that communicates using blockchains as disclosed herein can prove that the data has not been altered. Similarly, a recipient of data communicated via blockchains as disclosed herein can be assured that the data has not been altered.

Security is at a very high level with respect to blockchain based communications disclosed herein. As an example, a trade agreement with pricing information can be highly sensitive to a party and should be stored and communicated in a secure manner to prevent exposure via security breaches such as malware, fishing attacks, and others. By communicating financially sensitive information via blockchain nodes/distributed ledgers 602, as described herein, this information can be transferred and stored in a highly secure manner.

Traceability is another advantage of blockchain based communications disclosed herein. As examples, transaction audit logs and other traceability features of blockchain based communications disclosed herein provide support for preservation of pricing information and transparency of transactions. As an example, if a party wants to determine any changes made to an agreement, or wants to return to a previous agreement or pricing information, the prior data of the blockchain is readily available and traceable to do so.

Data recovery can be an advantageous feature of blockchain based communications disclosed herein. As described herein, a plurality of blockchain nodes can each maintain a copy of blockchain distributed ledgers in a network. Because multiple copies of a trade and pricing information are stored across a network, the information can be obtained even if it becomes unavailable at a particular blockchain node.

Each of communication links 604, 608, 612, 616, 620, 624, 628, and 632 in FIG. 6 can include one or more communication links, including any of the types of communication links discussed above regarding FIGS. 4 and 5. In addition, or alternatively, any of communication links 604, 608, 612, 616, 620, 624, 628, and 632 can include wired or wireless communication links within a single apparatus. As an example, communication links 608 and 612 may correspond to one or more wired or wireless communication links within a cryptography machine learning enabled blockchain based apparatus. As another example, communication link 616 may correspond to one or more wired or wireless communication links within memory of a cryptography machine learning enabled blockchain based apparatus, such as within memory 415 of computing device 401 discussed above regarding FIG. 4. As still another example, communication links 604 and 632 may correspond to one or more wired or wireless communication links between a cryptography machine learning enabled blockchain based apparatus and one or more blockchain nodes 630 or blockchain nodes/distributed ledgers 602.

Examples regarding receiving and providing a quote or spread for a financial service in connection with aspects of the present disclosure are described with respect to FIGS. 7A and 7B as follows.

Figure 7A:
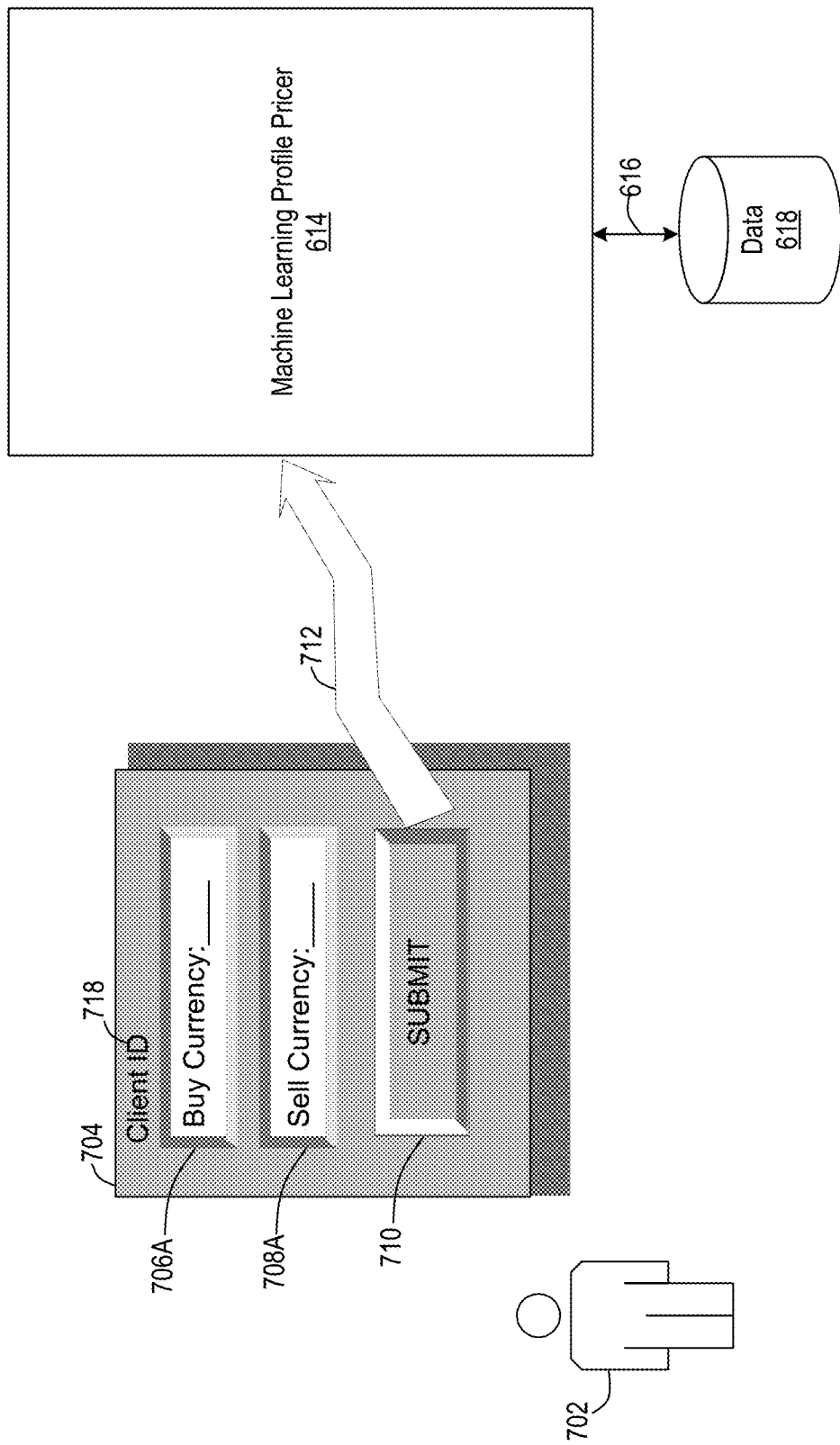
FIG. 7A depicts an illustrative example of a user interface that may be used in accordance with one or more illustrative aspects described herein.

FIG. 7A depicts an example of a user 702 requesting a quote for a financial service using a user interface 704, which may correspond to the user interface 626 described above regarding FIG. 6, and a machine learning profile pricer 614 receiving that request for a quote. In addition, data storage 618 described above can comprise a high performance in memory database stored internal or local to machine learning profile pricer 614. In some examples, the quote relates to an exchange of foreign currency (e.g., a forex trade), however, the quote can be for any other transaction, including, e.g., a loan, a certificate of deposit, or any other financial service. The user 702 may include a client or a potential client of financial services, identified as client ID 718, which can be entered by the client or potential client, automatically generated, or provided via another mechanism such as a client log-in process, use of client-specific application or interface, communication of a private key, or any other identification mechanism. At input 706A, the user 702 can enter buy currency, for example, U.S. Dollars. Input 706A could include a quantity and type of the currency (e.g., $1,500,000), a range of currency (e.g., less than $500,000, between $500,000 and $1,000,000, or greater than $1,000,000), or an indication of only the type of buy currency (e.g., $). At input 708A, the user 702 can enter a sell currency, for example, Euros. Input 708B could include a quantity and type of the currency (e.g., EUR 1,500,000), a range of currency (e.g., less than EUR 500,000, between EUR 500,000 and 1,000,000, or greater than EUR 1,000,000), or an indication of only the final type of currency (e.g., EUR). In addition, upon user 702 entering data in either of inputs 706A or 706B, the user interface 704 can automatically adjust options for the other input 706B or 706A, respectively. For example, if a user enters an indication of U.S. Dollars in input 706A, then the user interface 704 may exclude U.S. Dollars as an option for input 706B, e.g., providing other currency options for exchanging U.S. Dollars such as Euros, Great Britain Pounds, and other currencies. As another example, if a user enters a specific amount and type of currency in input 706B, such as $1,000,000, the user interface 704 may exclude both that currency type, e.g., U.S. Dollars, and an amount of currency as an option for input 706A, e.g., providing only types of currency for exchanging U.S. Dollars such as Euros, Great Britain Pounds, and the like. After user 702 enters data in inputs 706A and 706B, the user can submit the inputs for a quote via a selection mechanism 710, such as a "submit" button, carriage entry, voice command, fingerprint scan, or other input. The request for a quote can be communicated to the machine learning profile pricer 614 via communication link 712. Communication link 712 can comprise one or more of and communication link 624 and/or communication link 632 and operate as described above regarding FIG. 6.

Figure 7B:
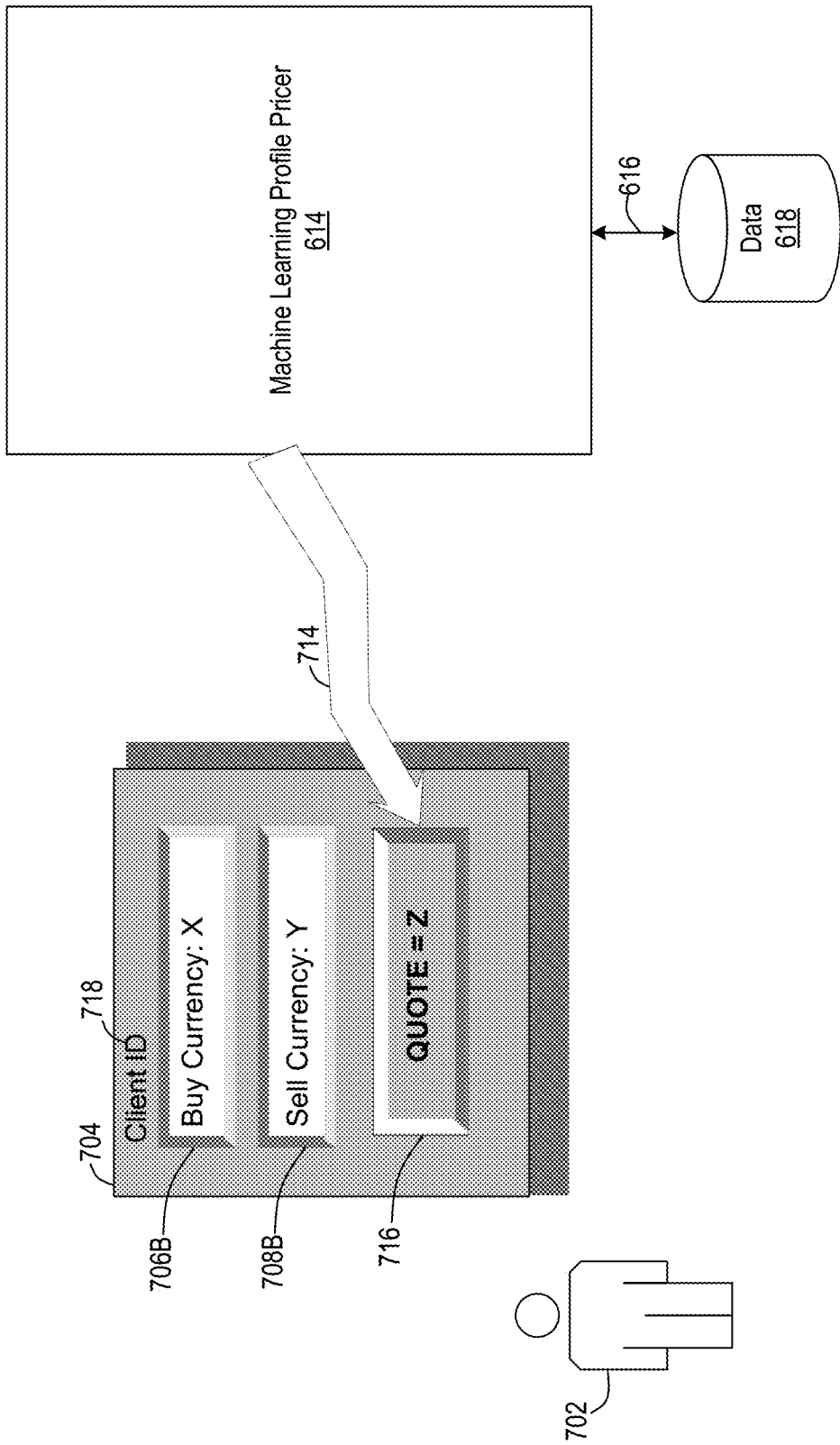
FIG. 7B depicts an illustrative example of a user interface that may be used in accordance with one or more illustrative aspects described herein.

FIG. 7B depicts an example of a user 702 receiving, and a machine learning profile pricer 614 transmitting, a quote 706 for a financial service at or to a user interface 704, which may correspond to the user interface 626 described above regarding FIG. 6. As explained above regarding FIG. 7A, in this example, the quote relates to an exchange of foreign currency such as a forex trade, however, the quote can be for any other transaction, including, e.g., a loan, a certificate of deposit, or any other financial service. At input 706B, the buy currency, for example, U.S. Dollars, can be displayed based on the input 706A previously entered by the user 702

(e.g., shown here as "X"). As above, input 706B could include a quantity and type of the currency (e.g., $1,500,000), a range of currency (e.g., less than $500,000, between $500,000 and $1,000,000, or greater than $1,000,000), or an indication of only the type of buy currency (e.g., $). Optionally, unlike input 706A, input 706B can be presented on user interface 704 in a manner that cannot be changed by the user 702, except, e.g., by returning to data input steps such as described above regarding FIG. 7A. At input 708B, the sell currency, for example, Euros, can be displayed based on the input 708A previously entered by the user 702 (e.g., shown here as "Y"). As above, input 708B could include a quantity and type of the currency (e.g., EUR 1,500,000), a range of currency (e.g., less than EUR 500,000, between EUR 500,000 and 1,000,000, or greater than EUR 1,000,000), or an indication of only the type of the sell currency (e.g., EUR). Optionally, unlike input 708A, input 708B can be presented on user interface 704 in a manner that cannot be changed by the user 702, except, e.g., by returning to data input steps described above regarding FIG. 7A. Finally, the quote 716 can be displayed on the user interface 704 based on the inputs 706B and 708B. The quote 716 could include a quantity and type of currency required to complete the transaction (e.g., $1,000,000 to exchange an buy currency type of U.S. Dollars to a sell currency of EUR 1,100,000), a rate or fixed cost to exchange a range of currency from (e.g., 3% and/or $50,000 to exchange between $1,000,000 and $1,500,000 from U.S. Dollars to Euros), or any other indication of a cost to the user (e.g., shown here as "Z") to exchange the currency pursuant to inputs 706B and 708B. The quote 716 can be communicated from the machine learning profile pricer 614 via communication link 714. Communication link 712 can comprise one or more of and communication link 624 and/or communication link 632 and operate as described above regarding FIG. 6. Optionally, user interface 704 can include an indication of client ID 718, described above regarding FIG. 7A.

Communication link 712 may be the same as, or different from, communication link 714. As an example, communication link 714 may contain financial data (e.g., quote and spread information) having greater sensitivity than communications received from communication link 712 (e.g., a request for a quote). As a result, communication link 712 may be configured for greater security, such as for blockchain communications, than communication link 714. In addition, the quote 716 can be displayed on user interface 704 at a time that can appear to the user 702 to be instantaneous or near instantaneous of the user requesting a quote via selection mechanism 710. That is, the processes of determining and communicating a quote, e.g., by machine learning profile pricer 614, to a user 702 on a user interface 704 may be in real-time or near real-time. As an example, these processes may be performed within seconds, microseconds, nano-seconds, or other time period such that a user 702 does not experience a delay from the time of requesting a quote (e.g., as described regarding FIG. 7A) to the time of receiving a quote displayed on user interface 704 (e.g., as described regarding FIG. 7B). As additional examples, the time between receiving a request for a quote described with respect to FIG. 7A and providing the quote 716 for display on user interface 704 (e.g., a second time period) may be substantially same as the time between transmitting the request for a quote via selection mechanism 710 and receipt of the quote, e.g., at machine learning profile pricer 614 (e.g., a first time period). In some embodiments the first time period may be the same as the second time period. In other embodiments, the second time period may be within a percentage greater than the first time period (e.g., 1%, 2%, 5%, 10%, 25%, 50%, 100%). In other embodiments, the second period may be within an order of magnitude greater than the first time period (e.g., a first time period of 0.1 second corresponding to a second time period of 1 second or less). The described processes for determining and communicating a quote can be in real-time or near real-time, at least in part, because data storage 618 can comprise a high-performance in memory database and at least some of the processes for determining a spread for a quote can be determined in advance of receiving a request for a quote. As examples, data storage 618 can include one or more user profiles that can be generated, e.g., based on third party data from an APA provider 622, at a time prior to receiving a request for a quote. One or more user profiles can be updated in response to receiving a request for a quote, to provide a quote or other information (e.g., a spread) that can be in real-time or near real-time with receiving a request for a quote.

While FIGS. 7A and 7B and their corresponding description provide a specific example of receiving a request for a currency exchange, and providing a quote and/or spread in response thereto, the above can also be applied for any other transaction, including any transactions regarding financial services, such as information relating to currency exchange, savings or lending interest rates, or other financial transactions.

Figure 8:
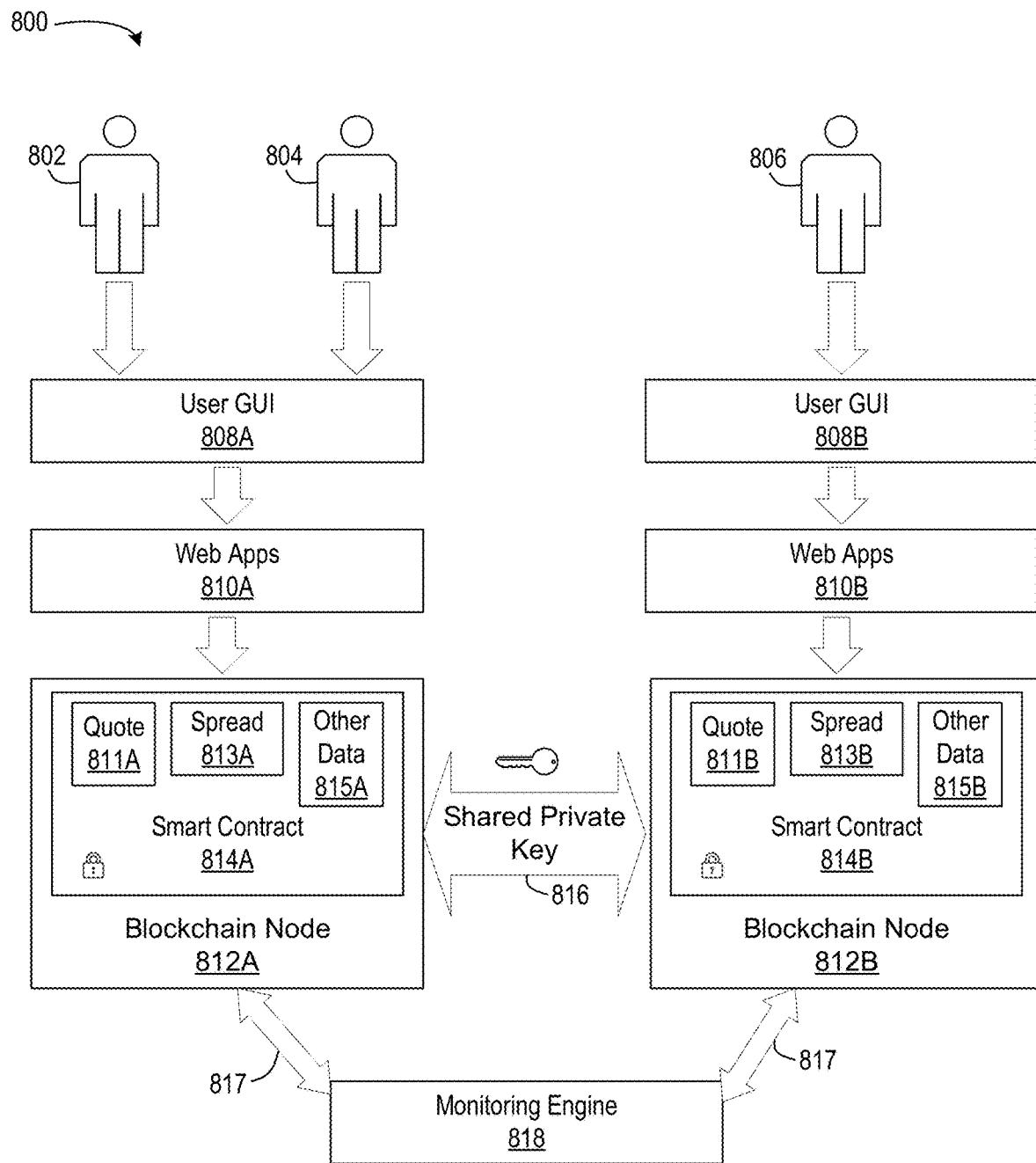
FIG. 8 depicts an illustrative example of a high-level system diagram for a blockchain based system in accordance with one or more illustrative aspects described herein.

FIG. 8 provides additional examples of aspects of the present disclosure relating to blockchain based distributed shared contracts that may be implemented by one or more of the components in FIGS. 4, 5, 6, 7A, 7B and/or other components, including other computing devices. FIG. 8 depicts a plurality of users 802, 804, and 806 in a system 800 for sharing smart contracts 814A and/or 814B among a plurality of blockchain nodes 812A and 812B. While only two blockchain nodes 812A and 812B are shown, system 800 can include any number of blockchain nodes across a network. Smart contracts 814A and/or 814B can include a plurality of information relevant to a transaction, including, e.g., quote 811A and 811B, spread 813A and 813B, and any other data 815A and 815B. Quote 811A and 811B can include a spread, currency pairs, currency amounts, transaction dates, client ID or other party identifier, and any other information. In some examples, user 806 may correspond to user 70 in FIGS. 7A and 7B, a user at user interface 626 in FIG. 6, or any other user described herein. Users 802 and 804 may correspond to a user with the same or different access rights as user 806. For example, user 802 could correspond to a sales representative of a financial services provider and may be able to access certain data related to a plurality of clients or potential clients. As another example, user 804 could correspond to a foreign exchange transactions representative of a financial services provider and may be able to access the same data as user 802 or additional data related to certain transactions involving clients, potential clients, or third parties. Any number of users may be provided with respective one or more various types of levels of access of data in system 800.

Each user 802, 804, and 806 can communicate in system 800 via respective user graphical user interfaces (GUIs) or other form of interface, such as GUI 808A (e.g., by users 802 and 804) and GUI 808B (e.g., by user 806). The GUIs 808A and 808B can operate in connection with one or more applications, such as respective Web applications ("Web Apps") 810A and 810B. As an example, GUIs 808A and 808B may include user interface 704 described above regarding FIGS. 7A and 7B. Similarly, as an example, Web Apps 810A and 810B can include a foreign currency exchange application such as that described above regarding FIGS. 7A and 7B. User GUI 808A and Web App 810A may be the same or different from GUI 808B and Web App 810B, respectively, depending on the type of user. For example, User GUI 808A and/or Web App 810A may include additionally functionality and/or data relative to GUI 808B and/or Web App 810B, respectively, e.g., if users 802 and 804 are representatives of a financial services institution that are provided with a greater level of access of institutional data relative to user 806 that may be a client or prospective client of that financial services institution. Users 802, 804, and 806 can use a Web App 810A and 810B, via a respective User GUI 808A and 808B in a computer device, such as computing device 401 described above, to communicate regarding a smart contract 812A and/or 812B stored at a respective blockchain node 812A and/or 812B. For example, a user 804 at a financial services institution can receive results from a machine learning profile pricer 614 described above regarding FIG. 6, and based on the results, determine or update an agreement for a financial transaction (e.g., forex trade) with a client, such as user 806. The agreement or terms thereof can be included in a smart contract 814A, such as in smart contract operations described above. The smart contract can be stored in a blockchain node 812A, which can include, e.g., a blockchain node storing blockchain distributed ledgers described above regarding FIG. 6. In addition, a copy of the smart contract 812A can be stored as smart contract 814B in blockchain node 812B. As an example, blockchain node 812B may correspond to blockchain 630 described above regarding FIG. 6, whereby smart contract 814B may be communicated from machine learning profile 614 to blockchain 630 via communication link 632. Users 802, 804, and 806 can access smart contract 814A and/or 814B via a shared private key 816. For example, User 806 can access the agreement or terms thereof by using the user's private key 816 to access smart contract 814B stored at blockchain node 812B, or obtain a copy of smart contract 814A stored at blockchain node 812A. By using blockchain technology with private/public key operations, such as described above regarding FIGS. 1, 2, and 3, information in smart contracts 814A and 814B can be communicated in a secure and transparent manner among users authorized to access such information.

System 800 can optionally include a monitoring engine 818 in communication with blockchain nodes 812A and 812B via communication links 817. Monitoring engine 818 can be located at any location in a network, including, e.g., in a cryptography machine learning enabled blockchain based apparatus described herein or remote therefrom. Monitoring engine 818 can be used to monitor communications between blockchain nodes throughout a network, including, e.g., blockchain nodes 812A and 812B. As examples, monitoring engine 818 can be used to detect and prevent a "51%" attack such as described above. In some embodiments, monitoring engine 818 can determine whether a party has control of within a threshold amount of blockchains, such as 40%, 45%, 48%, 49%, 50%, or 51%. If control of 50% or more of blockchain in a network by one party is detected, one or more communication links such as described above, e.g., regarding FIG. 6, can switch from using blockchains to using multi-lateral private messages for communications of sensitive data. Similar operations can be performed if control of a threshold amount below 50% (e.g., 49%, 48%, 45%, 40%) of blockchains by one party is detected so as to prevent a "51%" attack. As another example, if monitoring engine 818 detects one party, or a number of related parties, obtains or appears to attempt to obtain a threshold amount of blockchains that could lead to a "51%" or similar attack on the blockchain network, additional monitoring can be performed, such as increasing frequency of monitoring activities or adjusting to an increased level of security, e.g., using permissioned blockchains. If at any point in time a "51%" attack is anticipated or detected, any of the blockchain communications described herein can be switched, either permanently or temporarily, to using multi-lateral private messages for communications. If a threat subsides, multi-lateral private messages for communications can return to blockchain communications.

Figure 9:
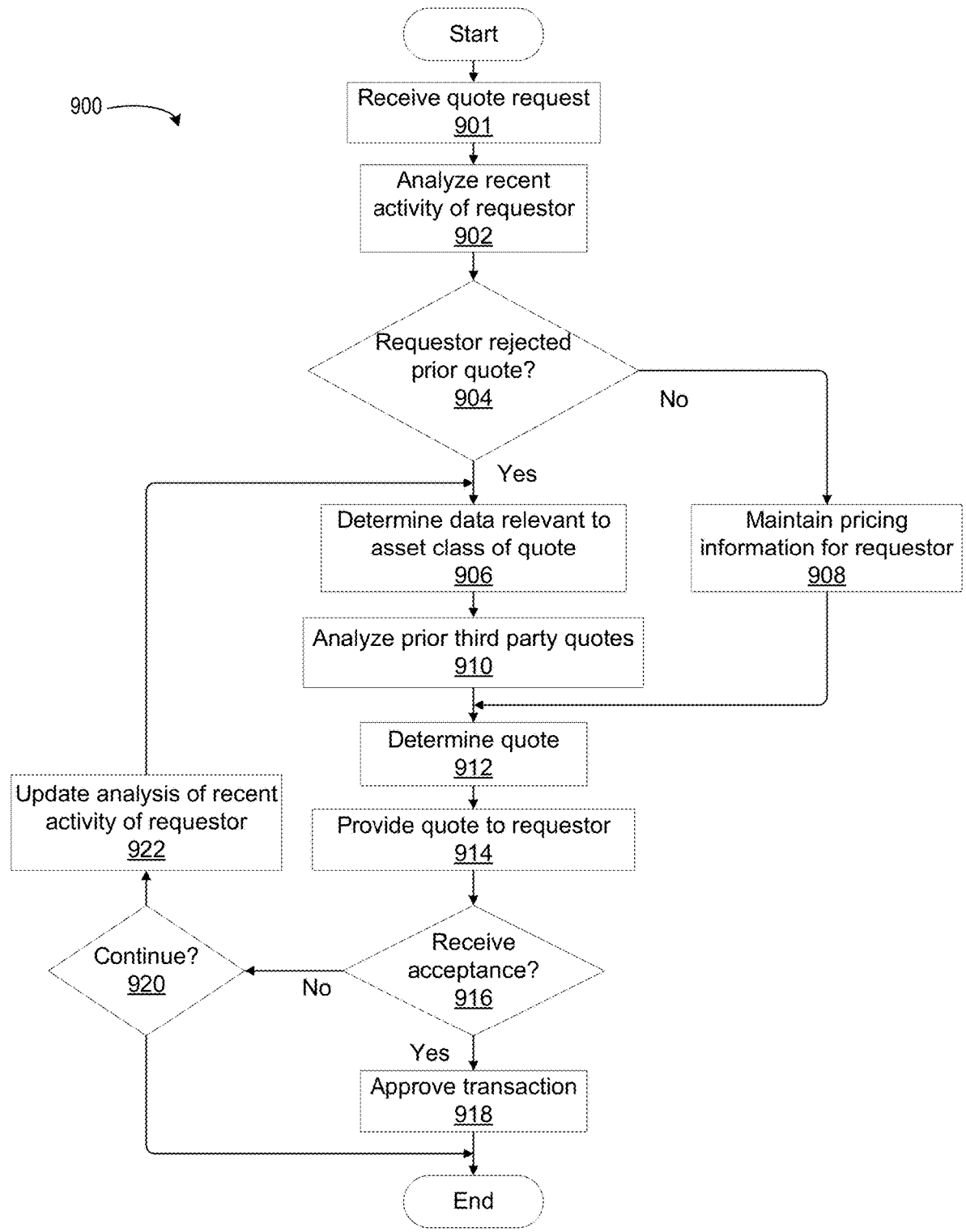
FIG. 9 depicts an illustrative example of a process for providing a quote to a user in accordance with one or more illustrative aspects described herein.

FIG. 9 shows a process 900 in accordance with various aspects of the disclosure, e.g., with respect to quotes and agreements. This process 900 discloses some steps that may be automatically performed, e.g., in real-time or near real-time, by the machine learning profile pricer 614, automated pricing workflow 606, or a combination thereof, such as in a cryptography machine learning enabled blockchain based apparatus. The process 900 can begin at step 901 with receiving a quote request. As an example, a cryptography machine learning enabled blockchain based apparatus may receive a request for a quote from a user for a currency exchange, or forex trade, such as described above regarding FIG. 7A. As other examples, a quote request can be for any other transaction, including any transactions regarding financial services, such as information relating to currency exchange, savings or lending interest rates, or other financial transactions. At step 901, the received request can also be analyzed to identify the user if the user has not already been identified such as via a user login. At step 902, recent activity of the user, or requestor of the quote, can be analyzed. For example, a machine learning profile pricer 614 such as described above regarding FIG. 6 may analyze data associated with the user that may be stored in data storage 618. Additionally, or alternatively, an automated pricing workflow 606 such as described above regarding FIG. 6 may analyze prior agreements, quotes, quote acceptances, or quote approvals. Analysis in step 902 can include retrieving and/or updating information from one or more user profiles previously stored in data source 618, described above. At step 904, the cryptography machine learning enabled blockchain based apparatus can determine whether the user rejected a prior quote, including, e.g., the quote most recently provided to the user. As an example, this determination can be performed by analyzing one or more user profiles previously stored in data source 618. If the prior quote was not rejected by the user, or was accepted by the user, the cryptography machine learning enabled blockchain based apparatus can maintain pricing information for the user, at step 908, following the "No" path from step 904. If, however, the prior quote was rejected by the user, following the "Yes" path from step 904, the apparatus can determine data relevant to an asset class of the quote, at step 906. Asset classes can include any categorization of assets, such as foreign exchanges, rates, commodities, and credit, described further below regarding FIG. 10. For example, if a quote is requested for an exchange of U.S. Dollars to Euros, then relevant data can include prior transactions involving an exchange of U.S. Dollars to Euros and/or Euros to U.S. Dollars. Relevant data of an asset class can be further narrowed to data specific to the quote requestor, such as prior acceptances or rejections of a quote, prior trades, transaction amounts, transaction dates, and any other information specific to a quote requestor, all of which may be stored in data storage 618 prior to step 901.

A quote can also be customized based on third party data. For example, third party data can be received from an APA provider 622, and stored in data storage 618, as described above regarding FIG. 6, including, e.g., prior to step 901. A machine learning profile pricer can analyze the third party data, at step 910. For example, as described above, as part of MiFID 2, APA providers will provide access to information such as quotes and trades from financial services institutions for a period of the previous six months. Information such as pricing and a spread of a foreign currency exchange, e.g., the difference between a market price and a quoted price, will be accessible. This information can be analyzed, at step 910, as part of process 900 to provide customized trade and pricing information, such as quotes. Additionally, or alternatively, analysis at step 910 can be initially performed prior to step 901 and supplemented with updated information at step 910, to help facilitate providing a quote in real-time or near real-time with a request for a quote. As an example of the analysis of third party quotes, some or all quotes accepted by the same requestor, or user, given by a competing financial institution, or rival bank, during a time period (e.g., 6 months, 3 months, 1 month, or any other period of time) for the same financial instrument (e.g., forex of the same currency types) can be identified and analyzed. In some examples, a regression analysis can be performed on this third party data, such as represented in the following equation:

$$\text{Proposed quote} = \text{Constant} + \sum_{i=n-1}^{i=0} \text{Coefficient} * \text{Quote\_given\_by\_rival\_bank}$$

where "constant" and "coefficient" are a constant term and one or more coefficients, respectively, in a regression equation, "n" is the number of values analyzed, and "Quote_given_by_rival_bank" represents the value of a third party quote previously accepted by the same requestor for the "proposed quote." Regression analysis can be performed prior to step 901, e.g., using information from user profiles previously stored in data storage 618. In addition, regression analysis can be updated, e.g., by performing fewer operations, such as a single series of the above or similar equation and combining it with one or more of a plurality of previously analyzed series of the above or similar equation. In this way, information used for generating quotes, spreads, and the like, can be updated incrementally, in real-time or near real-time, as data is received from APA provider 622 and/or from each performance of one or more steps in response to a request for a quote, such as described herein for process 900. While shown above more generally, additional examples of a regression analysis are described below regarding FIG. 13.

Based on the above information and analysis, an apparatus can determine a quote, at step 912, and provide the quote to a user at step 914. For example, a machine learning profile pricer 614 can provide a quote to a user via communication link 624 and/or communication link 632 as described above regarding FIG. 6. As another example, a machine learning profile pricer 614 can provide a quote via communication link 714 as described above regarding FIG. 7B. As another example, a quote can be communicated from one user, e.g., user 802 or user 804, to another user, e.g., user 806, via the system 800 described above regarding FIG. 8.

An acceptance of a quote can be received at step 916. Acceptance can be performed by a user providing a command via a user interface, such as user interface 626 described above regarding FIG. 6. As another example, an interface such as interface 704 can be included in a user's computing device, and a user can confirm acceptance of the quote in a manner such as described above regarding FIG. 7B. If an acceptance of the quote is received, the process continues via the "Yes" path from step 916 to step 918. At step 918, a transaction corresponding to the quote can be approved. For example, an automated pricing workflow 606, such as described above regarding FIG. 6, can approve a transaction of a forex trade corresponding to a quote provided to and accepted by a user. If acceptance of the quote is not received, or if the quote is rejected, the process can continue to step 920 via the "No" path from step 916. At step 920, it can be determined whether the process 900 should continue. For example, step 920 could be based on an expiration timer or the occurrence of a particular event, such as a change in relevant currency transaction rates. If it is determined at step 920 that the process 900 should not continue, or if the transaction is approved at step 918, the process 900 can end. If, however, it is determined that the process should continue at step 920, then an update can be performed at step 922 such that recent activity of the quote requestor can be further analyzed. For example, if the user has not accepted a quote within a threshold time period, or if it is determined that the user has accepted one or more quotes from a third party, an updated analysis can provide additional information that can be used in a repetition of the process 900, e.g., to determine relevant data, analyze third party quotes, determine a new quote, and provide that new quote to the user that may have an increased likelihood of acceptance by the user.

Figure 10:
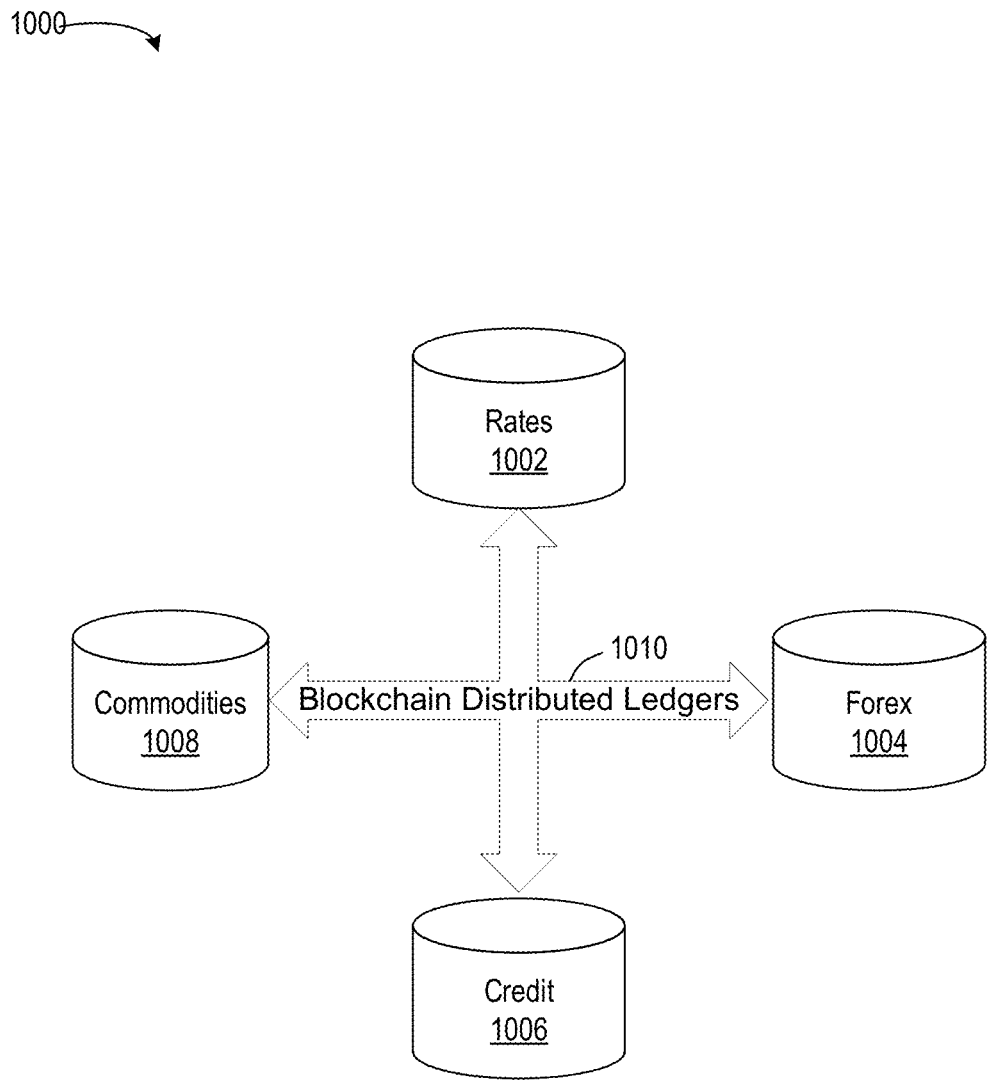
FIG. 10 depicts an illustrative example of a system for blockchain nodes and distributed ledgers in accordance with one or more illustrative aspects described herein.

FIG. 10 shows a blockchain system 1000 for blockchain distributed ledgers 1010 in accordance with an aspect of the disclosure. While some examples disclosed herein are provided with respect to forex trade or related transactions, system 1000 can include plurality of blockchain nodes each of which can host one or more of a variety of asset categories, including, e.g., a foreign exchanges (e.g., "Forex") node 1004, a "Rates" node 1002, a "Commodities" 1008, and a "Credit" node 1006. Each assert category can include one or more of blockchain nodes 1002, 1004, 1006, or 1008. Each of the systems, apparatuses, and methods described herein can be applied to any type of data, including to each of the asset categories described with respect to FIG. 10. Information can be communicated among the blockchain nodes 1002, 1004, 1006, or 1008 using blockchain distributed ledgers 1010 in accordance with blockchain operations described above. As an example, system 1000 can operate as a collection of blockchain nodes for storing the blockchain distributed ledgers, described above regarding FIG. 6. For example, system 1000 can communicate with automated pricing workflow 606 via communications link 604. Each blockchain node 1002, 1004, 1006, and 1008 is distributed and verifiable across the blockchain system 1000 using public and private keys. While trade and pricing information can be published to all parties available to the blockchain system 1000, only an intended recipient who has a private key for a transaction may be able to access information regarding the transaction. As another example, the blockchain communications described herein may be permissioned blockchains, whereby various restrictions may be placed on certain blockchain nodes which can lead to overall increased privacy, transaction speed, and control.

Figure 11:
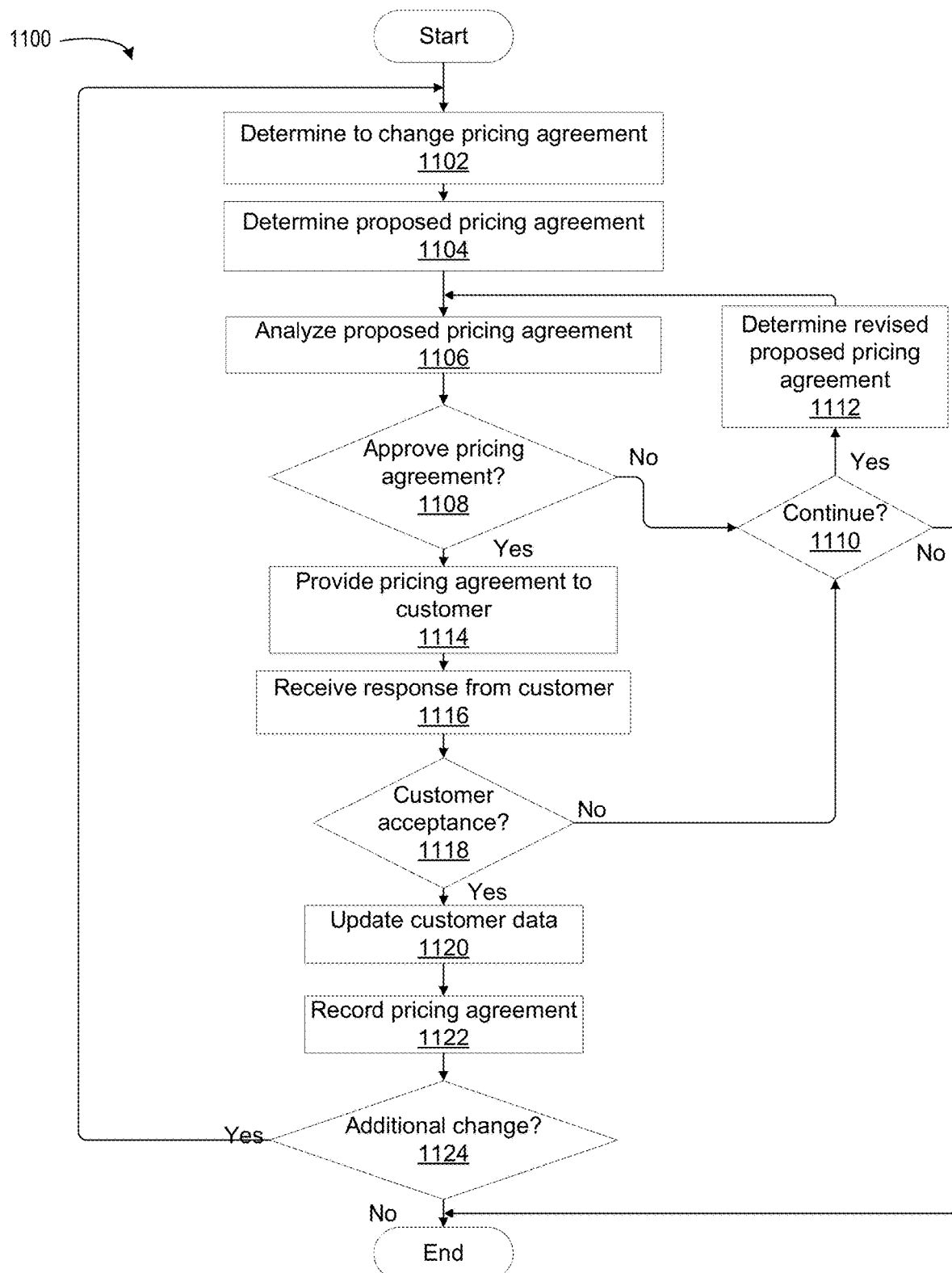
FIG. 11 depicts an illustrative example of a process for adjusting a pricing agreement in accordance with one or more illustrative aspects described herein.

FIG. 11 shows a process 1100 relating to pricing agreements in accordance with various aspects of the disclosure. This process 1100 discloses some steps that may be automatically performed, e.g., in real-time or near real-time, by the automated pricing workflow 606, the machine learning profile pricer 614, or a combination thereof, such as in a cryptography machine learning enabled blockchain based apparatus. The process 1100 can begin at step 1102 with determining to change a pricing agreement. As an example, a user may accept a quote for a currency exchange, such as described above regarding process 900 in FIG. 9, rendering a desire for a new pricing agreement based on the accepted quote. As another example, a user may not accept a quote, or a user may reject a quote, and in response it can be determined that a change in a pricing agreement should be proposed, e.g., to increase a likelihood that the user may accept it.

After it is determined that a change in a pricing agreement should be made, a proposed pricing agreement can be determined at step 1104. The proposed pricing agreement may be based on a prior pricing agreement that can be revised, e.g., to incorporate an accepted quote, or to account for a rejection or a lack of acceptance of a quote. One or more prior pricing agreements can be stored in data storage 618, as described above. After the proposed pricing agreement is determined, it can be analyzed at step 1106. For example, an automated pricing workflow 606 as described above regarding FIG. 6 can analyze the proposed pricing agreement, e.g., in real-time or near real-time, to determine appropriateness of terms based on a profile associated with the user and/or based on third party data related to agreements for similar transactions. Terms can include, e.g., rates, costs, spread, market price, quoted price, currency types, currency amounts, time periods, identification of parties, and any other term relevant to a pricing agreement. Based on the analysis of the proposed pricing agreement, it can be determined whether to approve the pricing agreement, at step 1108. The approval of the pricing agreement can be an automated process, a manual process, or a combination of both. For example, upon determination of one or more terms satisfying one or more thresholds or ranges of thresholds, the pricing agreement may be automatically approved; whereas upon determination of one or more terms falling outside one or more of the above thresholds or ranges of thresholds but, e.g., still satisfying other conditions, further analysis may require a manual process for approving the pricing agreement. If a pricing agreement is not approved, it can be determined whether further analysis should be performed, at step 1110. If it is determined that further analysis should be performed, e.g., if one or more terms are identified as potentially revisable (e.g., if it includes a spread or a rate that is not a minimum spread or rate the party has provided to a different client for the same type of transaction), then at step 1112 via the "Yes" path of step 1110, a revised proposed pricing agreement can be determined, and the process can continue to step 1106 described above for analysis and approval of the revised proposed pricing agreement. As another example, if a proposed pricing agreement includes a rate that is inconsistent with a rate for another agreement with the same user, then the proposed agreement could be revised to include the same rate as the other agreement with that user. If, however, it is determined that further analysis should not be performed, e.g., if the proposed terms were consistent with other accepted agreements and further revisions are deemed unnecessary or disadvantageous to the offering party, then the process 1100 can end via the "No" path from step 1110.

After a pricing agreement is approved, process 1100 can continue via the "Yes" path from step 1108. The approved pricing agreement can be provided to the customer, or user, at step 1114. As an example, a pricing agreement can be communicated from a machine learning profile pricer 614 to a blockchain node 632, via communication link 632, in communications such as described above regarding FIG. 6. The user can use a user interface 626 to view the agreement upon accessing it via communication link 628. Additionally, or alternatively, the pricing agreement can be communicated from a machine learning profile pricer 614 to a user interface 626 via communication link 624. The agreement can also be in the form of a smart contract, such as described above regarding the smart contract 814B in FIG. 8, that the user can access using a shared private key 816. Upon determining that the agreement is acceptable, the user may provide an indication of acceptance or rejection via communication link 628 and/or communication link 632. At step 1116, a response from the customer, or user, can be received. The response can be analyzed, at step 1118, to determine whether the customer has accepted the pricing agreement. In some examples, a timer can be used, whereby a failure to receive an indication of acceptance within a period of time results in a determination that the pricing agreement has not been accepted. If acceptance is not confirmed, then the process 1100 can return to step 1110, where it is determined whether the process should continue, as described above. If acceptance of the pricing agreement is confirmed, however, the process can continue to step 1120.

At step 1120, customer data can be updated based on the accepted pricing agreement. For example, one or more user profiles stored in data storage 618 can be updated to reflect one or more terms of the pricing agreement, such as rate, cost, spread, market price, quoted price, currency types, currency amounts, time periods, and any other term relevant to the pricing agreement and the customer or user. The pricing agreement can be recorded at step 1122. For example, the pricing agreement can be stored as a smart contract 814A at blockchain node 812A, described above regarding FIG. 8. Finally, the process 1100 can include a determination of whether any additional changes should be made, at step 1124. For example, if market conditions or other factors change from the time the pricing agreement was approved at step 1108, the process 1100 can return to step 1102 to determine whether to propose a change in the pricing agreement. Step 1124 can be performed at any time. In some examples, step 1124 can be performed in response a timer or predetermined change in one or more conditions relevant to a pricing agreement, such as changes in market prices of currency above or below a threshold, or the identification of a third party contract with the customer having different terms than the pricing agreement. If it is determined that no additional changes should be made to the pricing agreement, the process 1100 can end via the "No" path from step 1124.

Figure 12:
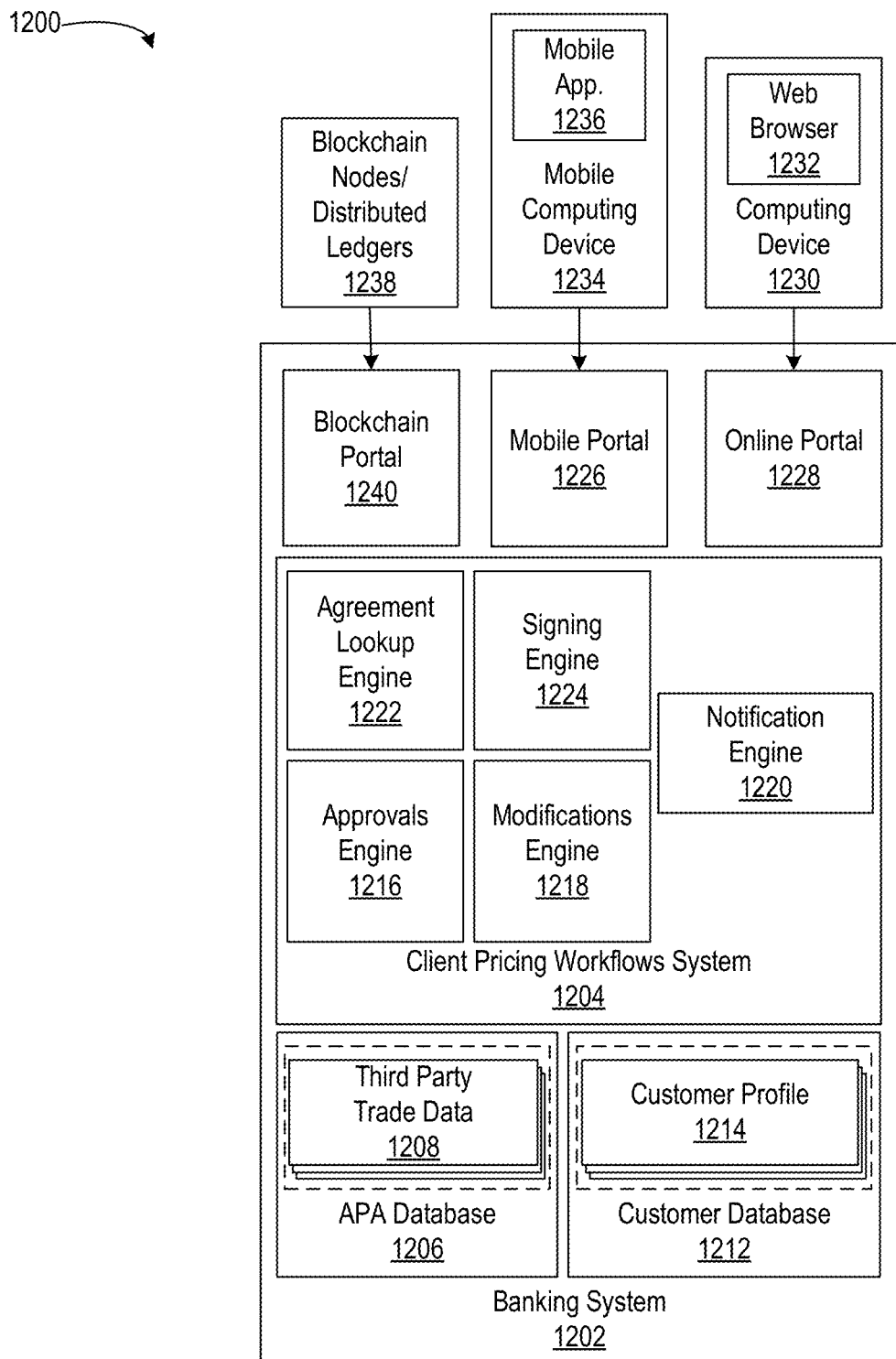
FIG. 12 depicts an illustrative example of a high-level system diagram for an automated pricing system in accordance with one or more illustrative aspects described herein.

Referring now to FIG. 12, a high-level diagram of an example of an implementation of an automated pricing workflow 1200 is shown. Some or all of the automated pricing workflow 1200 of FIG. 12 can be a mechanism, engine, or combination of engines implemented in the automated pricing workflow 606 described above regarding FIG. 6. The automated pricing workflow 1200 may be a component in a cryptography machine learning enabled blockchain based apparatus described herein. The automated mechanism 1200, in this example, includes a banking system 1202 comprising a client pricing workflow system 1204, databases 1206 and 1212, and portals 1226, 1228, and 1240 for communications with computing devices 1234 and 1230, and with blockchain ledgers 1238, respectively.

The client pricing workflows system 1204 provides an automated mechanism for trade agreements, including, e.g., to build, sign, approve, modify, and notify the trade agreements. Trade agreements agreement can contain the same or similar information as pricing agreements described above, and the processes described herein with respect to pricing agreements can also be applied to trade agreements. Similarly, the processes described herein with respect to trade agreements can also be applied to pricing agreements. In addition, the processes described herein with respect to quotes can also be applied to spreads or other trade or pricing information. And, the processes described herein with respect to spreads or other trade or pricing information can also be applied to quotes. In some examples, trade agreements contain information regarding a trade, such as an exchange of foreign currency, that has taken place between a buyer such as a user or client, and a seller such as a bank or other financial institution. In some examples, pricing agreements contain information regarding an accepted quote for a trade, such as a forex trade, that may not have yet taken place. Client pricing workflows system 1204 can include a plurality of engines, such as an approvals engine 1216, a modifications engine 1218, a notification engine 1220, an agreement lookup engine 1222, a signing engine 1224, and any other engine for performing operations relating to trade agreements. Approvals engine 1216 and signing engine 1224 carry out the trade approval and signing processes, respectively, by both parties to a trade (e.g., client and bank). Agreement lookup engine 1222 performs operations regarding review of the pricing plan and analysis of the impact an agreement may have on other operations. Modification engine 1218 performs operations for updating and editing trade agreements. Notification engine 1220 performs operations for notification services, such as emails or other notification during the process of building, signing, approving, and modifying trade agreements. One or more of the above engines 1216, 1218, 1220, 1222, and 1224 can perform one or more steps of the processes 900, 1100, and 1300 described herein regarding FIGS. 9, 11, and 13, respectively.

Banking system 1202 can include client pricing workflows system 1204 in addition to one or more customer databases 1212, one or more APA databases 1206, and one or more mobile portal 1226, online portal 1228, and blockchain portal 1240. Customer database 1212 includes a plurality of customer profiles 1214. Each customer may have a different customer profile 1214. In some examples, similar customers may be grouped into groups of customer profiles 1214. APA database includes third party trade data 1208. This third party trade data 1208 includes information regarding trades occurring during a prior time period, such as the previous six months, three months, one month, or any other time period. Third party trade data 1208 can include data from trades between customers and third parties, from non-customers and third parties, or a combination or both. Third party trade data 1208 can also include information from proposed trades (e.g., quotes, spreads, and others), including accepted trades, rejected trades, expired trades, repeat trades, or any other category of trades. Third party trade data 1208 can be stored in data storage 618 described above regarding FIG. 6. Third party trade data 1208 can also be used in the processes described above, such as in the analysis of prior third party quotes in step 910 of process 900 and in the analysis of a proposed pricing agreement in step 1106 of process 1100. Customer database 1212 and APA database 1206 can be used by client pricing workflows system 1204 to provide customer and third party information for the processes performed by engines 1216, 1218, 1220, 1222, and 1224.

Each portal 1226, 1228, and 1240 can enable banking system 1202 to communicate with another device. For example, mobile portal 1226 can enable banking system 1202 to communicate with mobile computing device 1234 through which a user may communicate using a mobile application 1236, which may correspond to Web App 810B described above regarding FIG. 8. As another example, online portal 1228 can enable banking system 1202 to communicate with computing device 1230 through which a user may communicate using a web browser 1232, or any other user interface such as user interface 626 described above regarding FIG. 6. As another example, blockchain portal 1240 can enable banking system 1202 to communicate with blockchain nodes/distributed ledgers 1238, which may correspond to blockchain nodes/distributed ledgers 602 described above regarding FIG. 6.

Figure 13:
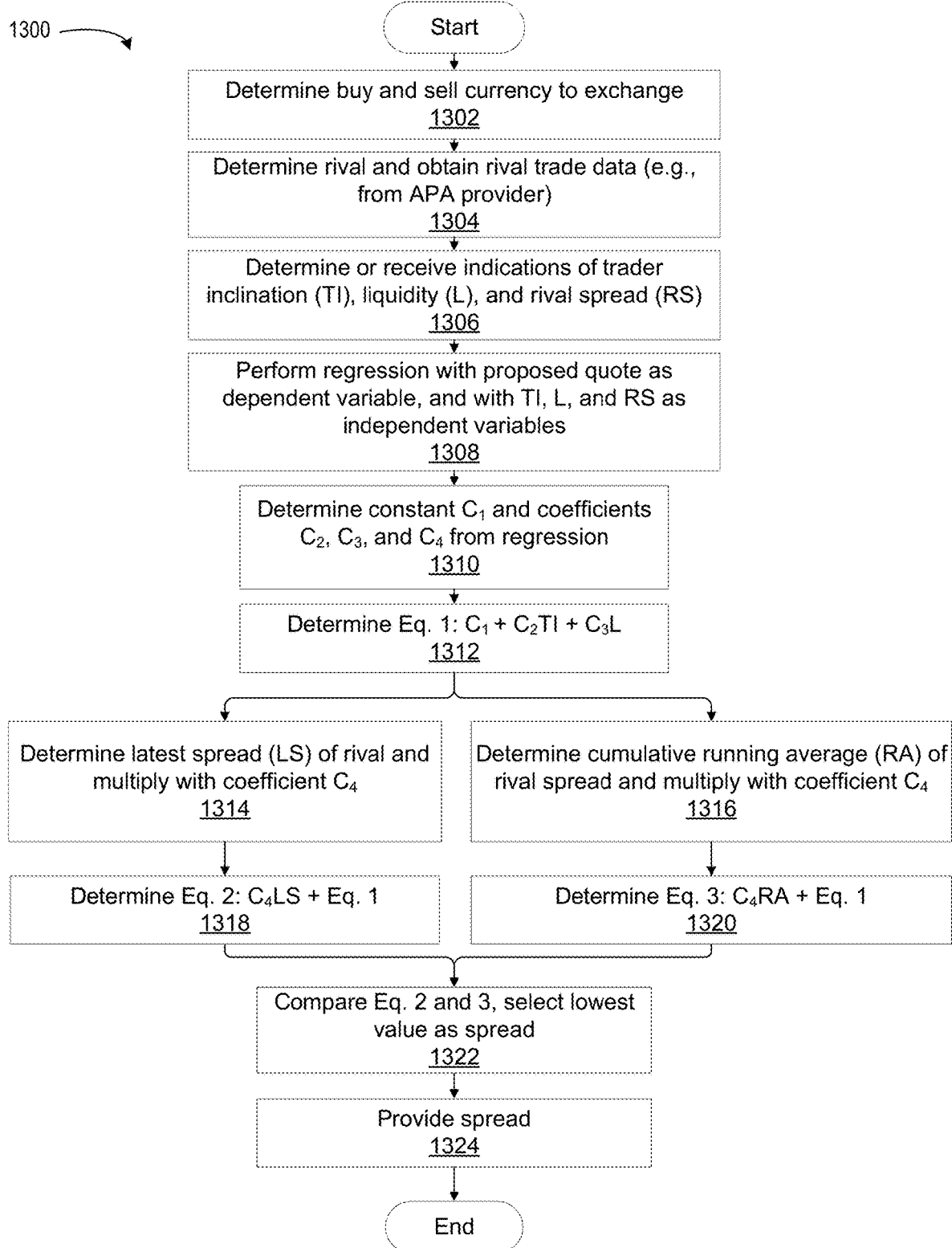
FIG. 13 depicts an illustrative example of a process for determining a spread in accordance with one or more illustrative aspects described herein.

FIG. 13 depicts an illustration of a process 1300 relating to a profile pricer in accordance with various aspects of the disclosure. This process 1300 includes some steps that may be automatically performed, e.g., in real-time or near real-time, by the machine learning profile pricer 614, the automated pricing workflow 606, or a combination thereof, such as in a cryptography machine learning enabled blockchain based apparatus. In addition, any one or more steps in process 1300 can be performed in advance of receiving a request for a quote, to assist in providing a spread or quote in real-time or near real-time as described herein. The process 1300 can begin at step 1302 with a determination of an initial currency type (e.g., a buy currency), a final currency type (e.g., a sell currency), and an amount of either to exchange in a forex trade. At step 1304, a competing institution, or a rival, for the forex trade can be determined or identified and trade information for that rival can be obtained. As an example, rival trade information can be obtained from an APA provider, such as APA provider 622 described above regarding FIG. 6. At step 1306, a profile pricer can determine or receive indications, for the currency determined at step 1302, each of a trader's inclination ("TI") to complete a trade, the forex trader's (or quote offeror's) liquidity (e.g., "L"), and the rival's spread (e.g., "RS") for the forex trade. The value of a trader's inclination can correspond to a general market sentiment on the particular currency pair. For example, a currency that has a high volatility level or a week long-term outlook may have a low value for TI (e.g., 0.215, 0.546, or 0.719), and a currency with low volatility or a strong long-term outlook may have a low value for TI (e.g., 1, 0.961, or 0.895). The value for TI can range from 0 to 1. The value of a quote offeror's liquidity, L, can be determined by dividing its total assets by its total liabilities. Liquidity can be in relation to the particular currency at issue, or for a plurality of currencies, or all currencies. As an example, a value of L is preferably above 1. The rival's spread, RS, can be based on the rival trade data. For example, quotes received from the rival and/or trades made by the rival can indicate a spread for each quote or trade, and that spread can correspond to RS.

At step 1308, a regression analysis can be performed. As an example, a multi-linear regression can be performed, such as described above, with a proposed quote as a dependent variable, and with historical liquidity data L, trader inclination data TI, and rival spread data RS as independent variables. Based on this regression, values for a constant or y-intercept, $C_1$, and coefficients $C_2$, $C_3$, and $C_4$, can be determined, at step 1310. Constant $C_1$ can correspond to a particular intercept point on a standard deviation curve, and coefficients $C_2$, $C_3$, and $C_4$, can provide correspond to weighted coefficient for each of TI, L, and RS, respectively.

At step 1312, an intermediate equation, Eq. 1, can be determined as follows:

Eq. $1 = C_1 + C_2TI + C_3L$

Next, one or both of steps 1314 and 1316 can be performed, as follows. At step 1314, the rival's latest spread (e.g., "LS") for a forex trade of the currency can be determined and multiplied with coefficient $C_4$ (e.g., to yield $C_4LS$) to provide a weighted LS value. Additionally, or alternatively, at step 1316 a cumulative running average (e.g., "RA") of the rival's prior spreads over a period of time or over a number of trades can be determined and multiplied with $C_4$ (e.g., to yield $C_4RA$) to provide a weighted RA. As an example, if a rival's spread from its two most recent trades of the currency at issue was 0.8 and 0.9, the cumulative running average is 0.85 (i.e., (spread$_1$+ . . . spread$_n$)/n, where n is the number of rival trades considered).

If step 1314 is performed, at step 1318, the value from Eq. 1 is added to the value from step 1314 in Eq. 2, shown below. Similarly, if step 1316 is performed, at step 1320, the value from Eq. 1 is added to the value from step 1316 in Eq. 3, shown below:

Eq. $2 = Eq.1 + C_4LS$

Eq. $3 = Eq.1 + C_4RA$

Ultimately, the above equations can be represented as follows, where a rival's spread RS can represent, e.g., a latest spread (LS) or a cumulative running average (RA):

Eq. $4 = C_1 + C_2TI + C_3L + C_4RS$

The process 1300 can conclude in one of three ways. In a first way, at step 1322, the value of Eq. 2 can be compared with the value of Eq. 3, and the lowest of the two values can be selected and, at step 1324, provided as a spread in a quote. In a second way, steps 1322, 1314, and 1318 can be skipped and, at step 1324, the value of Eq. 3 can be provided as a spread in a quote. And, in a third way, steps 1322, 1316, and 1320 can be skipped and, at step 1324, the value of Eq. 2 can be provided as a spread in a quote. Thus, a quote can be provided in various ways that each provide a spread for a customized quote based on a rival's trade information as described above. Each of the above steps in process 1300 can be performed in an automated manner, e.g., in real-time or near real-time. One or more of the above steps in process 1300 can be performed simultaneously, or in different a different order as shown. For example, the equation shown above as "Eq. 4" can be performed in place of separate steps 1312 and 1318, or in place of separate steps 1312 and 1320. Alternatively, one or more steps could be performed manually. The spread provided at step 1324 can be transmitted, e.g., in a quote, to a user using blockchain technology described herein. As an example, the spread at step 1324 can be provided in quote by machine learning profile pricer 614 to a blockchain node 630 via communication link 632, and/or to a user interface 626 via communication link 624 or communication link 628, as described above regarding FIG. 6. As another example, one or more steps of process 1300 can be performed in one or more of steps 910, 912, and 914 described above regarding FIG. 9. As another example, the spread provided at step 1324 can be included in quote 716 described above regarding FIG. 7B. Any other examples for providing a quote to a user as described herein may use one or more steps in process 1300.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

We claim:

1. A method for generating a real-time or near real-time quote for an exchange of foreign currency comprising:
   receiving, by a machine learning profile pricing server, third party data of a plurality of exchanges of foreign currency;
   determining, by one or more processors and using the third party data, a plurality of user profiles, wherein a first user profile of the plurality of user profiles is associated with a first user that is a party to at least one of the plurality of exchanges of foreign currency;
   storing before a first time, in one or more databases, the plurality of user profiles;
   receiving, at the first time and from a first computing device, a request for a quote for an exchange of foreign currency, wherein the request comprises an indication of a buy currency and an indication of a sell currency;
   generating the quote using the machine learning profile pricing server and based on information corresponding to historical acceptance of similar quotes, wherein the quote comprises a proposed spread generated by:
      determining a first user spread for one or more exchanges of the buy currency and the sell currency by the first user;
      performing a regression analysis to calculate:
         an intercept constant; and
         one or more coefficients for:
            an indication of market conditions;
            an indication of liquidity; and
            the first user spread;
      summing results from the regression analysis;
   based on analysis of a previous smart contact, transmitting, at a second time, via a permissioned blockchain distributed ledger accessible via a private key and to a plurality of blockchain nodes, an indication of the quote, wherein a difference between the second time of the transmitting and the first time of the receiving of the request is such that the quote is provided for display, as a smart contract visualization on a user interface of the first computing device, in real-time or near real-time with the request;
   receiving, by an approvals engine and from the user interface of the first computing device based on the private key, an indication of acceptance or rejection of the smart contract; and
   executing a data transfer based on acceptance of the smart contract being received from the user interface of the first computing device and acceptance received from a second computing device of a computing system associated with the quote.

2. The method of claim 1, wherein the determining the first user spread comprises determining a cumulative running average of spreads from a plurality of accepted trades by the first user.

3. The method of claim 1, wherein the determining the first user spread comprises determining a spread from a most recent accepted trade by the first user.

4. The method of claim 1, wherein the determining the first user spread comprises:

determining a cumulative running average of spreads from a plurality of accepted trades by the first user;
determining a spread from a most recent accepted trade by the first user; and
selecting, as the first user spread, a lesser of:
the cumulative running average of spreads; and
the spread from the most recent accepted trade.

5. The method of claim 1, further comprising adjusting the quote based on a comparison of the quote with one or more quotes that were not accepted.

6. The method of claim 1, wherein the one or more coefficients comprises a first coefficient, a second coefficient, and a third coefficient, and wherein performing the summation using results from the regression analysis comprises a summation of:
the intercept constant;
a product of the first coefficient and the indication of market conditions;
a product of the second coefficient and the indication of liquidity; and
a product of the third coefficient and the first user spread.

7. The method of claim 1, further comprising
receiving, from the first computing device, an indication that the quote is acceptable;
determining, based on the quote, a pricing agreement; and
transmitting, via the permissioned blockchain distributed ledger and to the plurality of blockchain nodes, the smart contract comprising the pricing agreement.

8. The method of claim 1, wherein one or more of the determining the first user spread and the performing the regression analysis are performed prior to the first time.

9. The method of claim 1, wherein receiving the third party data comprises receiving the third party data from an Approved Publication Arrangement provider.

10. The method of claim 1, comprising:
comparing, by a monitoring engine, an indicia of control of an amount of blockchains to a threshold condition;
switching, based on the comparing and on meeting the threshold condition, communications to using multi-lateral private messages for communications; and
switching, based on the comparing, communications from multi-lateral private messages to blockchain communications when the threshold condition is not met.

11. A cryptography machine learning enabled blockchain based apparatus, the apparatus comprising:
one or more interfaces for communications with a plurality of users and a plurality of blockchain nodes;
one or more processors configured to execute computer-executable instructions; and
memory storing the computer-executable instructions that, when executed by the one or more processors, cause the apparatus to:
receive third party data of a plurality of exchanges of foreign currency;
determine, by one or more processors and using the third party data, a plurality of user profiles, wherein a first user profile of the plurality of user profiles is associated with a first user that is a party to at least one of the plurality of exchanges of foreign currency;
store, before a first time and in the memory, the plurality of user profiles;
receive, at the first time, via the one or more interfaces, and from a first computing device, a request for a quote for an exchange of foreign currency, wherein the request comprises an indication of a buy currency and an indication of a sell currency;
generate the quote, wherein the quote comprises a smart contract including a private key and a proposed spread, and wherein to generate the quote the instructions, when executed by the one or more processors, cause the apparatus to:
determine a first user spread for one or more exchanges of the buy currency and the sell currency by the first user;
perform a regression analysis to determine:
an intercept constant; and
one or more coefficients for:
an indication of market conditions;
an indication of liquidity; and
the first user spread;
perform a summation using results from the regression analysis;
determine, based on an analysis of existing blocks of a permissioned blockchain distributed ledger, whether a similar quote has been rejected;
transmit, at a second time, via the permissioned blockchain distributed ledger accessible via a private key, and to the plurality of blockchain nodes, the smart contract comprising an indication of the quote, wherein a difference between the second time of transmission of the indication of the quote and the first time of the receipt of the request for a quote is such that the quote is provided for display, as a smart contract visualization on a user interface of the first computing device, in real-time or near real-time with the request;
receive, via the smart contract from the user interface of the first computing device based on the private key, an indication of acceptance or rejection of the smart contract;
receive, via the smart contract from a second computing device of a computing system associated with the quote and based on the private key, an indication of acceptance or rejection of the smart contract; and
initiate execution of a data transfer based on an indication of acceptance of the smart contract being received from the user interface of the first computing device and an indication of acceptance received from a second computing device of a computing system associated with the quote.

12. The cryptography machine learning enabled blockchain based apparatus of claim 11, wherein the computer-executable instructions, when executed by the one or more processors, further cause the apparatus to determine the first user spread using a cumulative running average of spreads from a plurality of accepted trades by the first user.

13. The cryptography machine learning enabled blockchain based apparatus of claim 11, wherein the computer-executable instructions, when executed by the one or more processors, further cause the apparatus to determine the first user spread using a most recent accepted trade by the first user.

14. The cryptography machine learning enabled blockchain based apparatus of claim 11, wherein the computer-executable instructions, when executed by the one or more processors, further cause the apparatus to:
determine a cumulative running average of spreads from a plurality of accepted trades by the first user;
determine a spread from a most recent accepted trade by the first user; and select, as the first user spread, a lesser of:
the cumulative running average of spreads; and
the spread from the most recent accepted trade.

15. The cryptography machine learning enabled blockchain based apparatus of claim 11, wherein the computer-executable instructions, when executed by the one or more processors, further cause the apparatus to adjust the quote based on a comparison of the quote with one or more quotes that were not accepted.

16. The cryptography machine learning enabled blockchain based apparatus of claim 11, wherein the one or more coefficients comprises a first coefficient, a second coefficient, and a third coefficient, and wherein the computer-executable instructions, when executed by the one or more processors, cause the apparatus to perform the summation by performing a summation of:
the intercept constant;
a product of the first coefficient and the indication of market conditions;
a product of the second coefficient and the indication of liquidity; and
a product of the third coefficient and the first user spread.

17. The cryptography machine learning enabled blockchain based apparatus of claim 11, wherein the computer-executable instructions, when executed by the one or more processors, cause the apparatus to:
receive, from the first computing device, an indication that the quote is acceptable;
determine, based on the quote, a pricing agreement; and
transmit, via the permissioned blockchain distributed ledger and to the plurality of blockchain nodes, a smart contract comprising the pricing agreement.

18. The cryptography machine learning enabled blockchain based apparatus of claim 11, wherein the computer-executable instructions, when executed by the one or more processors, cause the apparatus to perform, prior to the first time, one or more of the determining the first user spread and the performing the regression analysis.

* * * * *